United States Patent
Broussard et al.

(10) Patent No.: US 7,580,863 B2
(45) Date of Patent: Aug. 25, 2009

(54) METHOD, SYSTEM, AND COMPUTER PROGRAM PRODUCT FOR OPERATING A PUBLICLY ACCESSIBLE PURCHASING SYSTEM

(75) Inventors: Scott J. Broussard, Cedar Park, TX (US); Joseph Herbert McIntyre, Austin, TX (US); Eduardo N. Spring, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1713 days.

(21) Appl. No.: 10/205,122

(22) Filed: Jul. 25, 2002

(65) Prior Publication Data
US 2004/0019530 A1    Jan. 29, 2004

(51) Int. Cl.
*G06Q 30/00* (2006.01)
(52) U.S. Cl. ............ 705/26; 705/1; 705/27; 705/37
(58) Field of Classification Search ............ 705/26, 705/27
See application file for complete search history.

(56) References Cited

U.S. PATENT DOCUMENTS

| | | | | |
|---|---|---|---|---|
| 4,712,923 | A | 12/1987 | Martin | 368/10 |
| 5,199,009 | A | 3/1993 | Svast | 368/240 |
| 5,915,238 | A | 6/1999 | Tjaden | 704/260 |
| 2001/0047308 | A1* | 11/2001 | Kaminsky et al. | 705/26 |
| 2002/0013736 | A1* | 1/2002 | I'Anson et al. | 705/26 |
| 2002/0013774 | A1* | 1/2002 | Morimoto | 705/80 |
| 2002/0147656 | A1* | 10/2002 | Tam et al. | 705/26 |
| 2003/0074209 | A1* | 4/2003 | Tobin | 705/1 |

OTHER PUBLICATIONS www.pella.com. Jun. 27, 2001. accessed Sep. 19, 2005 via www.archive.org.*
"Pella Redesigns, Updates Web Site." Intermountain Contractor. New York: Mar. 20, 2002. vol. 58, Iss. 3; p. 63.*
"Is eBay moving beyond auctions?" Margaret Kane, ZDNet.co.uk, Jan. 28, 2000.*

* cited by examiner

*Primary Examiner*—Jeffrey A. Smith
*Assistant Examiner*—Michael A. Misiaszek
(74) *Attorney, Agent, or Firm*—John R. Biggers; Jill Poinboeuf; Biggers & Ohanian, LLP.

(57) ABSTRACT

Operating a publicly accessible purchasing system including receiving, on a receipt date, from a purchaser, in a publicly accessible purchasing system, a deferred purchase request ("DPR") for an item to be purchased; identifying a vendor; and issuing, in dependence upon the DPR, a purchase order to the vendor on a date subsequent to the receipt date. In some embodiments, a DPR includes an item identification for the item to be purchased, and identifying a vendor further comprises identifying a vendor in dependence upon the item identification. Some embodiments includes selecting a vendor in dependence upon vendor item prices. Some embodiments include selecting a vendor having a lowest vendor item price for the item to be purchased. Embodiments include selecting vendors in dependence upon purchasers' indicated maximum prices, in independence upon information in purchase orders previously issued to vendors, and in dependence upon proximity of a vendor to a purchaser.

48 Claims, 15 Drawing Sheets

| | Deferred Purchasing Request Record Structure | | |
|---|---|---|---|
| 300 | Field | Data Type | Description |
| 302 | DPR_id | Integer Not null | Unique ID for DPR (Foreign Key) |
| 304 | Purch_id | Integer Not null | Unique ID for Purchaser |
| 306 | Purch_name | Varchar(64) | Purchaser's name |
| 308 | Purch_add | Varchar(254) | Purchaser's address |
| 310 | Purch_phone | Integer | Purchaser's phone number |
| 312 | Purch_email | Varchar(64) | Purchaser's electronic mail address |
| 314 | Purch_facs | Integer | Purchaser's facsimile number |
| 316 | DPR_date | Integer | Date the DPR was created |
| 318 | DPR_issue date | Integer | Date the DPR is to be issued |
| 320 | Item_id | Integer Not null | Unique identification for the item (Foreign Key) |
| 322 | Item_desc | Varchar(254) | Description of the item |
| 326 | Vendor_id | Integer | Unique identification for the vendor |
| 332 | Vendor_name | Varchar(64) | Vendor name |
| 334 | Vendor_add | Varchar(254) | Vendor address |
| 336 | Vendor_phone | Integer | Vendor telephone number |
| 338 | Vendor_email | Varchar (64) | Vendor electronic mail address |
| 340 | Vendor_facs | Integer | Vendor facsimile number |
| 342 | Delivery_add | Varchar(254) | Address for item delivery |
| 344 | Payment_info | Char(1) | Payment information. 1=by credit card; 2=by debit card; 3=check; 4=COD |
| 346 | Payment_acct_id | Integer | Credit card number, debit card number, checking accout number |
| 348 | Payment_acct_name | Varchar (64) | Credit card issuer, debit card issuer, checking account institution |
| 350 | Payment_acct_exp | Integer | Expiration date for credit card |

Figure 3

| Item Table |||
|---|---|---|
| Field Names | Data Type | Description |
| Item_id | Integer, not null | Unique ID for the item (Primary key) |
| Item_type | Varchar (32) | Type code for the item |
| Item_desc. | Varchar (254) | Description of the item |
| Item_weight | Integer | Item weight in pounds |

900 — Item Table
902 — Item_id
904 — Item_type
906 — Item_desc.
908 — Item_weight

Figure 9

| Vendor Table |||
|---|---|---|
| Column | Data Type | Description |
| Vendor_id | Integer, not null | Unique ID for the vendor (Primary key) |
| Vendor_name | Varchar (32) | Text name for the vendor |
| Vendor_phone | Integer | Vendor telephone number |
| Vendor_facs | Integer | Vendor facsimile number |
| Vendor_email | Varchar (64) | Vendor electronic mail address |
| Vendor_web | Varchar (128) | Vendor website address |
| Vendor_mail | Varchar (254) | Vendor postal address |
| Vendor_street | Varchar (32) | Vendor street address |
| Vendor_city | Varchar (32) | Vendor city |
| Vendor_state | Varchar (32) | Vendor state |
| Vendor_zip | Varchar (32) | Vendor mail code |
| Vendor_country | Varchar (32) | Vendor country |

Figure 10

| Vendor-Item Relations Table |||
|---|---|---|
| Field Name | Data Type | Description |
| Vendor_id | Integer, not null | Unique ID for the vendor (Foreign Key) |
| Item_id | Integer | Unique ID for items (Foreign Key) |
| Item_price | Float | Vendor's Item price |

Figure 11

| Purchase Order Table | | |
|---|---|---|
| Column | Data Type | Description |
| Purchase_order_id | Integer | Unique ID for each purchase order |
| Vendor_id | Integer | ID for the vendor (Foreign key) |
| Purchaser_id | Integer | ID for the purchaser (Foreign key) |
| Purchase_order_history | Char | Purchase order history: Issued = '1'; Cancelled = '2' |

1400 — (table)
1402 — Purchase_order_id
1404 — Vendor_id
1406 — Purchaser_id
1408 — Purchase_order_history

Figure 14

METHOD, SYSTEM, AND COMPUTER PROGRAM PRODUCT FOR OPERATING A PUBLICLY ACCESSIBLE PURCHASING SYSTEM

BACKGROUND OF THE INVENTION

1. Field of the Invention

The field of the invention is data processing, or, more specifically, methods, systems, and products for publicly accessible deferred purchasing systems.

2. Description of Related Art

In the current art of on-line purchasing, there is no useful way to enter a delayed purchase request for a purchase order to be issued to a vendor at a later time. In current art, on-line purchasers enter current purchase orders directed to known vendors. Often, however, purchasers have gift or supply purchasing obligations, or other purchasing obligations, occurring at predictable times in the future, for which it would be convenient to plan now, for example, as an aid to memory or as part of a budgeted business plan. Or in some cases, regardless of memory or plans, a purchaser has time to work on-line now but knows that she will not have much time later when a purchase is needed.

That is, the subject of the present disclosure is delayed purchasing. More specifically, our subject is knowing today that a purchaser wishes to effect a purchase at some time in the future and making available to the purchaser a publicly-accessible system for entering deferred purchase requests having issue dates that result in the issuance of purchase orders on the issue dates. The advantage of such a public delayed purchasing system is that delayed purchase orders can be created as planning mechanisms days, week, or months in advance of the actual issuance date, for convenience, for planning, as aids to memory, for birthdays, anniversaries, holiday gifts and greetings, and so on. The benefits are for personal use and for business use, as in the case of advance entries of deferred purchase requests for estimated quantities of office supplies, so that even tiny businesses can have the benefits of 'just-in-time' controls of needed supplies, with no need to invest heavily in the infrastructure to effect such controls.

A publicly available delayed purchasing system would be even more beneficial if it were accessible by a variety of network-oriented interfaces, including, for example, personal computers communicating via the Internet, ordinary telephones, hand-held wireless internet-enabled special purpose devices, internet-enabled personal digital assistants, mobile phones, internet-enabled cell phones, and so on. Such publicly accessible delayed purchasing systems do not exist, although it would be advantageous if they did.

SUMMARY OF THE INVENTION

Embodiments are presented for operating publicly accessible purchasing systems, including receiving, on a receipt date, from a purchaser, in a publicly accessible purchasing system, a deferred purchase request ("DPR") for an item to be purchased; identifying a vendor; and issuing, in dependence upon the DPR, a purchase order to the vendor on a date subsequent to the receipt date. In some embodiments, a DPR includes an item identification for an item to be purchased, and identifying a vendor comprises identifying a vendor in dependence upon the item identification. Some embodiments include selecting a selected vendor in dependence upon vendor item prices. In some embodiments, selecting a selected vendor in dependence upon vendor item prices includes selecting a vendor having a lowest vendor item price for the item to be purchased.

Some embodiments include selecting a vendor in dependence upon a purchaser's indication of a maximum price, in dependence upon information in purchase orders previously issued to vendors, in dependence upon proximity of a vendor to a purchaser. Deferred purchasing systems according to the present invention implement data communication with purchasers and vendors through telecommunications, via Jain SLEE or Parlay environments, for example, and through web-based data communications via web pages.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THF DRAWINGS

FIG. 3 depicts an example of an embodiment of a table for deferred purchase requests.

FIG. 9 depicts an example data structure for representing items in a table.

FIG. 10 depicts an example data structure for representing vendors in a table.

FIG. 11 depicts an example data structure for representing vendors and items in an associate table.

FIG. 14 depicts an example data structure for representing purchase orders in a table.

DETAILED DESCRIPTION OF EXEMPLARY EMBODIMENTS

Introduction

Figure 1:
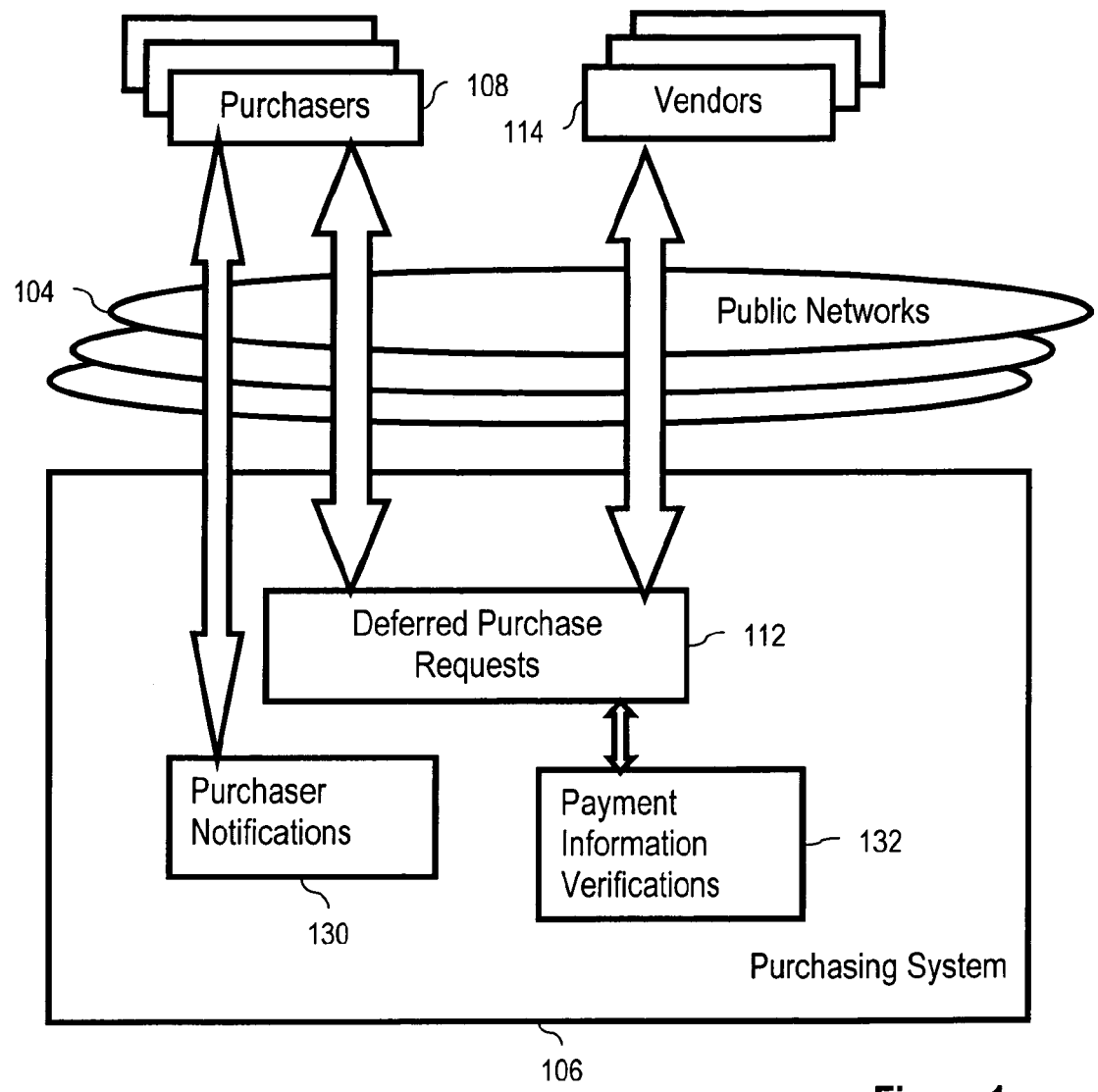
FIG. 1 is a general process flow diagram illustrating a typical example embodiment of the present invention.

The present invention is described to a large extent in this specification in terms of methods for publicly accessible deferred purchasing systems. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executed on computer hardware, nevertheless, alternative embodiments implemented as firmware or as hardware are well within the scope of the present invention.

Definitions

In this specification, the term "field" is used to refer to data elements, that is, to individual elements of digital data. Aggregates of fields are referred to as "records" or "data structures." Aggregates of records are referred to as "tables." Aggregates of tables are referred to as "databases." Records and fields in a table are sometimes referred to respectively as "rows" and "columns."

"Browser" means a web browser, a communications application for locating and displaying web pages. Browsers typically comprise both a markup language interpreter, web page display routines, and an HTTP communications client. Typical browsers today can display text, graphics, audio and video. Browsers are operative in web-enabled devices, including wireless web-enabled devices. Browsers in wireless web-enabled devices often are downsized browsers called "microbrowsers." Microbrowsers in wireless web-enabled devices often support markup languages other than HTML, including for example, WML, the Wireless Markup Language.

"CGI" means "Common Gateway Interface," a standard technology for data communications of resources between web servers and web clients. More specifically, CGI provides a standard interface between servers and server-side 'gateway' programs which administer actual reads and writes of data to and from file systems and databases. The CGI interface typically sends data to gateway programs through environment variables or as data to be read by the gateway programs through their standard inputs. Gateway programs typically return data through standard output.

A "foreign key" is a field in a first table that identifies and references a field in a second table. When such a foreign key is present the two tables are said to be "related."

Data Definition Language ("DDL") is often used to create data schema or record structures for tables. In this specification, scripts operable for creating record structures in tables are referred to as 'DDL scripts.'

"DPR" abbreviates Deferred Purchase Request, a request received in a deferred purchasing system from a purchaser, the request representing an instruction to issue to a vendor on behalf of the purchaser a purchase order formulated according to detailed information provided as part of the DPR. DPRs are non-binding requests that a purchase can alter or cancel at anytime prior to issuance of a purchase order.

"HTML" stands for 'HypterText Markup Language,' a standard markup language for displaying web pages on browsers.

"HTTP" stands for 'HyperText Transport Protocol,' the standard data communications protocol of the World Wide Web.

"Item" or "item to be purchased" and variants refer not only to tangible goods, but also to any entity, tangible or intangible, with respect to which rights may be transferred, including, for example, equipment, real estate, software, graphic images, patented inventions, other forms of intellectual property, information embodied in digital form, and so on.

"Parlay" refers to the Open Service Access ("OSA") Application Programming Interface ("API") of the multi-vendor industry consortium known as the "Parlay Group." The OSA API is a technology-independent API that enables applications and technology solutions to operate across multiple networking platform environments.

"Purchase" and its variants, "sale," "sell," "purchasing," "purchaser," and so on, as used in this disclosure, refers not only to acquisition of ownership in tangible goods, but also to acquisition of any kind of right in any entity, tangible or intangible, with respect to which rights may be transferred, including for example lease rights in equipment or real estate, license rights in software, graphic images, patented inventions, other forms of intellectual property, contractual rights, rights in information embodied in digital form, and so on.

A "purchase order" is an offer, conferring upon an offerree vendor a power of binding acceptance in accordance with its terms, to purchase, license, lease, rent, or otherwise acquire, goods, services, or intellectual property as described in the purchase order. A purchase order, unlike a DPR, typically is expected to be binding, that is, only capable of termination or alteration in accordance with terms and conditions set forth in the purchase order itself. There is within the scope of the present invention no limitation regarding the form of a purchase order. A purchase order can comprise a contract for purchase of real estate, a real estate lease, a software license, a license of patented industrial technology, an equipment lease, a purchase contract for tangible goods, and so on, including any form of offer as will occur to those of skill in the art.

"Server" in this specification refers to a computer or device comprising automated computing machinery on a network that manages resources and requests for access to resources.

A "web server," or "HTTP server," in particular is a server that communicates with browsers by means of HTTP in order to manage and make available to networked computers documents in markup languages like HTML, digital objects, and other resources.

A "servlet" is a program designed to be executed from within another application, usually a web server's HTTP service. More particularly, servlets, unlike most application programs, are not intended to be executed directly from an operating system. Generally in this disclosure, "servlet" refers to Java servlets running on web servers providing data communications for user interfaces for deferred purchasing systems. As such, servlets are an alternative to CGI programs capable of handling actual reads and writes of data to and from file systems and databases.

A "SLEE server" is a server operating portable telecommunication services and application frameworks in a JAIN SLEE compliant execution environment. "JAIN" refers to the JAVA API for Integrated Networks. SLEE servers in typical embodiments of the present invention are implemented in JAVA using the JTAPI, the Java Telephony API. "JAIN SLEE," or the JAIN Service Logic Execution Environment, an element of Sun Microsystems' industry-oriented de facto standard JAIN initiative, is a set of interfaces and standards for telecommunications and Internet operations within carrier grade telecommunications networks and Internet networks. JAIN-compliant telecommunications services are tested and deployed in the JAIN Service Logic Execution Environment.

"World Wide Web," or more simply "the web," refers to a system of internet protocol ("IP") servers that support specially formatted documents, documents formatted in markup languages such as HTML, XML, WML, or HDML. The term "Web" is used in this specification also to refer to any server or connected group or interconnected groups of servers that implement a hyperlinking protocol, such as HTTP or WAP (the 'Wireless Access Protocol'), in support of URIs and documents in markup languages, regardless whether such servers or groups of servers are coupled to the World Wide Web as such.

"Wireless Application Protocol ("WAP") is a specification for users with handheld wireless devices to access information, including information on the internet and other applications utilizing the Internet Protocol (IP). The devices include mobile phones, pagers, two-way radios, hand-held computers, and the like.

DETAILED DESCRIPTION

In this disclosure we present exemplary embodiments of a publicly accessible deferred purchasing system that provides the public an opportunity to place an order for goods or services and indicate a date in the future on which a purchase order will issue to a vendor for the goods or services. In typical embodiments of the present invention, purchasers have accounts with a provider and have secure access through logon identifications and security codes. The provider in such embodiments is typically a telephone service provider or an internet service provider.

Embodiments of the invention typically include a user-interface that prompts the purchaser for appropriate information resulting in the creation of a deferred purchasing request, referred to herein as a "DPR." A purchase order is created based on the DPR and is issued on an "issue date" selected by the purchaser.

FIG. 1 is a block diagram depicting the overall structure of a deferred purchasing system according to an exemplary embodiment of the present invention. The deferred purchasing according to FIG. 1 includes purchasers (108) who enter deferred purchase requests (112) through public networks (104) into the deferred purchasing system (106). Embodiments of this kind include optional purchaser notifications (130) and optional payment information verifications (132). Embodiments of the kind illustrated in FIG. 1 are described in more detail below.

In embodiments of the kind shown in FIG. 1, public networks (104) include any kind of electronic communications network including internets and telecommunications networks, as described below in more detail. The execution environments of typical embodiments, such as, for example, SLEE and Parlay, are intended to operate across a variety of network platforms, including the Public Switched Telephone Network (PSTN), wireless networks, packet-based networks, LANs, WANs, internets, intranets, and so on. Communications protocols useful in various embodiments include the Internet Protocol ("IP") and the Asynchronous Transfer Mode ("ATM").

Figure 2:
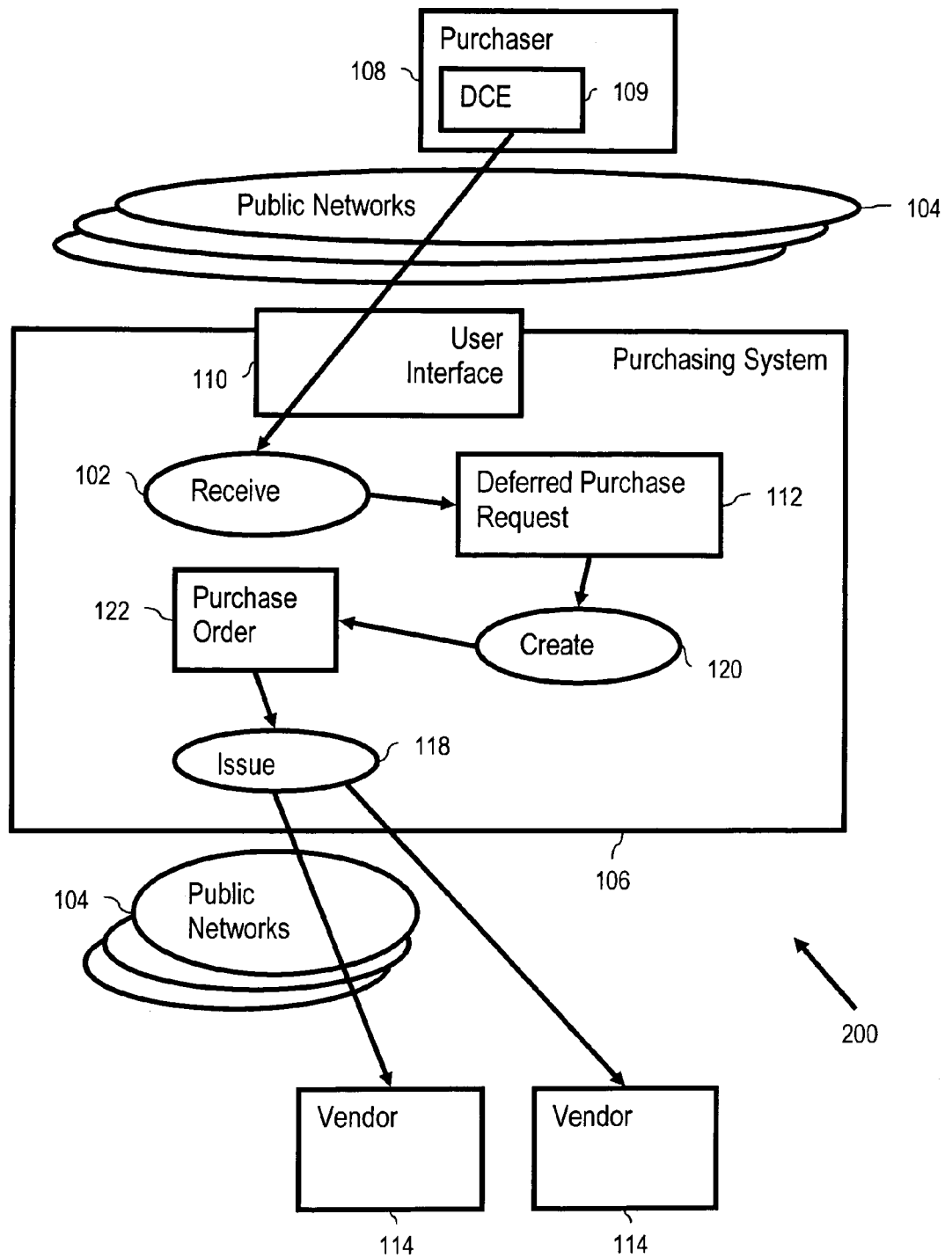
FIG. 2 is a general process flow diagram illustrating a typical example embodiment of the present invention.

Turning now to FIG. 2, an exemplary embodiment (200) of the present invention is shown as a method for operating a publicly accessible deferred purchasing system. Embodiments of the kind shown in FIG. 2 include receiving (102) in a publicly accessible (104) deferred purchasing system (106), from a purchaser (108) through a user-interface (110), a deferred purchase request ("DPR") (112).

In embodiments of the kind shown in FIG. 2, the purchaser utilizes data communication equipment ("DCE") (109) for the user-interface (110) with the deferred purchasing system (106). DCE is any equipment capable of carrying out communication of information or data with a purchasing system. DCE can include, for example, a wired telephone, wireless telephone, personal digital assistants ("PDA"), computer systems, mobile computers, hand-held computers, laptop computers, network-enabled special purpose devices, and so on.

Within the Parlay OSA API is a generic user interface service capability feature. This generic user interface service capability feature is used by applications to interact with end-users. The generic user interface service capability feature includes a generic user interaction interface with methods to interact with an end-user. These methods include sending information to, or gathering information from the user, including users attached to a call. For call related purposes, a user interaction object is created. Information sent to the user includes announcements, menus, text, and data, the information being pre-defined or otherwise identified through Uniform Resource Locators (URLs) and the like. In collecting information from the end-user, a menu or announcement usually prompts for input such as a number of characters, including digits or text strings (such as "YES" if the end-user is using a telephone as the DCE (109)).

In a typical embodiment of the type shown in FIG. 2, receiving (102) a DPR (112) includes a purchaser's accessing the deferred purchasing system (106) by placing a telephone call to the deferred purchasing system. In this case, the public network (104) is a typical Public Switched Telephone Network ("PSTN") and the purchaser's DCE (109) is a telephone handset. In response, a Parlay server establishes the call and creates a Parlay user interaction object for a user interaction with the purchaser. The user interaction object communicates an audible menu to the purchaser, the menu comprising prompts for a series of inputs from the purchaser's telephone keypad. The deferred purchasing system receives the inputs and stores the inputs as data in a DPR record.

In such an embodiment, the audible menu prompt typically includes a request to input a unique user account number and personal identification number ("PIN") using the telephone keypad, and both numbers must correspond to an authorized user account number and an authorized PIN. Once the authorization is established a subsequent audible prompt typically includes a message requesting the purchaser to input characters using the telephone keypad to describe the item to be purchased. In some embodiments, this item description input comprises a unique identification number (reference 320 on FIG. 3). The deferred purchasing system receives and stores the responsive identification number in the DPR record.

In other embodiments, the item description input includes telephone keypad responses to audible menu questions such as "Please choose from the following types of products: For clothing, press 1. For furniture, press 2. For photographic equipment, press 3." Sub-menus are typically provided, as necessary, until the item is sufficiently described. For example, if the purchaser's response to the foregoing question was the keystroke "3," the next menu typically includes a message such as "Please choose from the following types of photographic equipment: For digital cameras, press 1. For film cameras, press 2. For camcorders press 3." As the purchaser inputs a numeric response to each question through the telephone keypad, the deferred purchasing system receives and records the characters in the DPR record.

In such embodiments, subsequent audible announcements prompt for a telephone keypad entry of an issue date (reference 318 on FIG. 3) by presenting an audible message to the purchaser such as: "Please enter the date on which you wish a purchase order to be issued for the item. Please enter four digits for the year, followed by two digits for the month, and two digits for the day of the month." The deferred purchasing system receives (102) responsive input from the purchaser's telephone keypad and stores the input in the DPR record as the issue date.

In other typical embodiments of the type shown in FIG. 2, receiving (102) a DPR (112) includes a purchaser's accessing the deferred purchasing system (106) by placing a telephone call to the deferred purchasing system. In this case, the public network (104) is a typical Public Switched Telephone Network ("PSTN") and the purchaser's DCE (109) is a telephone handset. In response, a Parlay server establishes the call and creates a Parlay user interaction object for a user interaction with the purchaser. The user interaction object communicates an audible menu to the purchaser, the menu comprising prompts for a series of inputs comprising spoken responses from the purchaser.

In such embodiments, wherein the input comprises spoken responses by the purchaser, the menu prompts for a spoken response from the purchaser and voice recognition software converts the purchaser's verbal response for storage in the DPR record. For example, the first audible menu prompt typically includes a message such as: "Please describe the item for which you want to place a deferred order." As the purchaser responds, the verbal answer is converted to digital text. The next audible prompt typically reads back the digital text to the purchaser in a message such as: "You have ordered a Brand X Camcorder, Model XYZ. If this is correct, say Yes. If this is incorrect, say No." A "No" response typically causes the original message requesting an item description to repeat. When a "Yes" response is received the deferred purchasing system is typically programmed to store the confirmed digital text in the DPR record as the item description (reference 322 on FIG. 3) or, optionally, the item identification (reference 320 on FIG. 3).

Similarly, embodiments of the kind shown in FIG. 2 that request a spoken response typically include an audible menu prompt with a message such as: "Please state the date on which you wish a purchase order to be issued for the item." The voice recognition software then converts the verbal response from the purchaser to digital data in a date format and the deferred purchasing system stores the data in the DPR record as the issue date (reference 318 on FIG. 3).

In still other embodiments of the kind shown in FIG. 2, the deferred purchasing system (106) includes a web server with a conventional web site address that is publicly accessible by a purchaser (108). The purchaser's DCE (109) is a computer system having a web browser, monitor, mouse and keyboard. In these embodiments, the public network (104) is the internet, and receiving (102) the DPR (112) includes the purchaser's web browser creating a user-interface (110) with the deferred purchasing system web server when the purchaser enters the deferred purchasing system website address on the purchaser's computer keyboard. Once the web browser establishes the user-interface, the deferred purchasing system typically presents a visible message on the purchaser's monitor such as: "Please enter your user account number and password." Following the purchaser's responsive entry of an authorized user account number and password, the deferred purchasing system typically presents item description menus on the purchaser's monitor to which the purchaser responds using the keyboard or a mouse. The deferred purchasing system receives (102) the purchaser's selection and records the purchaser's selection in the DPR record as the item description (reference 322 on FIG. 3) or, optionally, the item identification (reference 320 on FIG. 3).

In such embodiments, the deferred purchasing system typically presents another visible message on the purchaser's monitor such as: "Please enter the date on which you wish a purchase order to be issued for the item." The purchaser again responds with input through the keyboard or mouse and the deferred purchasing system receives (102) the date and records the date in the DPR record (112) as the issue date (reference 318 on FIG. 3).

In additional embodiments of the kind shown in FIG. 2, the purchaser's DCE (109) is a hand-held computer including a micro-browser, screen display and keyboard. The deferred purchasing system (106) includes a Wireless Application Protocol (WAP) server accessible by the hand-held computer for the transmission and receipt of data through applications using the Internet Protocol (IP). In these embodiments, the public network (104) is a wireless network, and receiving (102) the DPR (112) includes the purchaser's micro-browser creating a user-interface (110) with the deferred purchasing system web server when the purchaser enters the deferred purchasing system website address on the purchaser's computer keyboard. Once the micro-browser establishes the user-interface, the deferred purchasing system typically presents a visible message on the purchaser's hand-held computer screen display such as: Please enter your user account number and password." Following the purchaser's responsive entry of an authorized user account number and password, the deferred purchasing system typically presents item description menus on the purchaser's screen display and the purchaser inputs a response using the keyboard. The deferred purchasing system receives (102) the purchaser's inputted response and records the response in the DPR record as the item description (reference 320 on FIG. 3) or, optionally, as the item identification (reference 322 on FIG. 3).

In such embodiments wherein the purchaser's DCE (109) is a hand-held computer, the deferred purchasing system typically presents another visible message on the purchaser's screen display such as: "Please enter the date on which you wish a purchase order to be issued for the item." The purchaser again inputs a response through the keyboard and the deferred purchasing system receives the date and records the date in the DPR record as the issue date (reference 318 on FIG. 3). In additional embodiments wherein the purchaser's DCE (109) is a hand-held computer, the purchaser inputs responses on the screen display using a stylus instead of a keyboard.

In still additional embodiments of the type shown in FIG. 2, the deferred purchasing system (106) includes a web server and the purchaser's DCE (109) includes a computer system having a web browser, monitor, keyboard, and mouse. The deferred purchasing system web server and the purchaser's computer system also include Voice over IP (VOIP) hardware and software. VOIP is a combination of hardware and software that provides a verbal conversation over the internet. In these embodiments the public network (104) is the internet, and receiving (102) the DPR (112) includes the purchaser's web browser creating a user-interface (110) with the deferred purchasing system web server when the purchaser enters the deferred purchasing system website address on the purchaser's computer keyboard. Once the web browser establishes the user-interface, the deferred purchasing system typically prompts the purchaser for a spoken item description while simultaneously providing visual product images on the purchaser's monitor.

For such embodiments, wherein VOIP is utilized, a typical verbal message would be: "Please state which of the displayed product categories you wish to review." The purchaser's verbal response is received through VOIP and the deferred purchasing system is programmed to provide successive displays and accompanying verbal prompts until a sufficient item description has been verbally input by the purchaser. For example, the final product screen display and verbal prompt typically includes a display of several camcorder models marketed by a manufacturer and a verbal prompt such as: "Please state the Brand X model you wish to purchase." The purchaser's verbal response of "Model XYZ" completes the necessary item description input and the deferred purchasing system receives the data representing the purchaser's response and records the data in the DPR record as the item description (reference 322 on FIG. 3) or, optionally, the item identification (reference 320 on FIG. 3).

For the foregoing embodiments using VOIP, the deferred purchasing system also typically sends a verbal prompt for an issue date such as: "Please state the date on which you wish a purchase order to issue for the item." The purchaser's verbal response is input and the deferred purchasing system receives the data representing the response and records the data in the DPR record as the issue date (reference 318 on FIG. 3).

For the kind of embodiments shown in FIG. 2, the DPR typically includes a DPR identification (reference 302 on FIG. 3), wherein the DPR identification is a unique identification for the DPR record that is created by the deferred purchasing system. The DPR also includes for such embodiments a purchaser identification (reference 304 on FIG. 3) and an item description of an item to be purchased (reference 322 on FIG. 3). The purchaser identification is a unique identification for the purchaser whose input created the DPR. In typical embodiments, this identification is the purchaser's previously established user account number.

In some embodiments of the kind illustrated in FIG. 2, the deferred purchasing system is controlled by a single vendor and all purchase orders issue to the controlling vendor. In other embodiments, wherein the deferred purchasing system is not so controlled, the purchaser inputs a vendor description, such as the vendor identification (reference 326 on FIG. 3), and the deferred purchasing system receives the vendor identification and records the description in the DPR record. Optionally, the purchaser inputs a vendor name (reference 332 on FIG. 3).

For example, in embodiments wherein the purchaser's DCE (109) is a telephone and a Parlay user interaction object has been created, the user interaction object typically prompts the purchaser for a telephone keypad inputted vendor identification number, by prompting with an audible menu prompt such as: "Please enter the three digit number for the vendor from which you would like to purchase the item." The purchaser then enters the digits known by the purchaser to specify the vendor and the deferred purchasing system receives the inputted digits and stores the inputted digits in the DPR record as the vendor identification (reference 326 on FIG. 3).

Embodiments of the kind shown in FIG. 2 typically include creating (120) a purchase order (122) in dependence upon the DPR (112) and issuing the purchase order to a vendor (114) on the issue date. In these embodiments, creating a purchase order in dependence upon the DPR includes deriving data from a DPR record and incorporating the data into a purchase order. For example, data in the DPR record provides the identity of the vendor chosen by the purchaser (108) and the description of the item to be purchased. In some embodiments, vendor information needed to deliver the purchase order to the vendor is also derived from data in the DPR record, such as the vendor's name (reference 332 on FIG. 3), address (reference 334 on FIG. 3), telephone number (reference 336 on FIG. 3), electronic mail address (reference 338 on FIG. 3), or facsimile number (reference 340 on FIG. 3). In some embodiments, the purchaser inputs vendor information in response to prompts at the time the DPR is created. In other embodiments, this vendor information is stored in separate, pre-existing vendor records within the deferred purchasing system, the storage occurring prior to the creation of the DPR record.

Further embodiments of the present invention are illustrated in which a DPR (112) optionally includes for the purchaser, a name (306), an address (308), a telephone number (310), an electronic mail address (312), a facsimile number (314), and a delivery address (342). In such embodiments, the subsequently issued purchase order (122) provides all or part of such information to the vendor (114) for the vendor's use in determining wherein to ship the item, soliciting additional information from the purchaser, entering the purchaser in a general customer database maintained by the vendor, and so on. In some embodiments, the purchaser name, address, telephone number, electronic mail address, facsimile number, and delivery address are stored in the DPR record from input received from the purchaser at the time the DPR is created. In other embodiments, the deferred purchase system loads such additional purchaser information into the DPR record from separate, pre-existing user account records.

For embodiments according to FIG. 2, wherein the purchase order (122) issues (118) to the vendor (114) by mail, creating (120) the purchaser order (122) includes merging item description data into a word processing file and printing the word processing file as a hardcopy document. In other embodiments, wherein the purchase order (122) issues (118) to the vendor (114) by electronic mail, creating (120) the purchase order typically includes merging the item description data into an electronic mail file and electronically mailing the electronic mail file to the vendor's electronic address using a deferred purchasing system mail server.

In other embodiments of the kind shown in FIG. 2, wherein the purchase order (122) is issued to the vendor (114) by facsimile, creating (120) the purchase order typically includes merging the item description data into an electronic facsimile file and sending the electronic facsimile file to the vendor facsimile number. In such embodiments, the only hardcopy purchase order produced is the hardcopy generated at the vendor's facsimile machine.

In still other embodiments of the kind shown in FIG. 2, wherein the purchase order (122) is issued (118) to the vendor (114) by telephone, creating the purchase order typically includes creating a recorded purchase order message that incorporates the item description data and purchaser information, such as the purchaser name (reference 306 on FIG. 3) and purchaser address (reference 308 on FIG. 3), from the DPR record. The deferred purchasing system then automatically calls the vendor using the vendor telephone number (reference 336 on FIG. 3) and delivers the message. In such embodiments, the vendor typically has voice recognition software for receiving audible telephone messages such as this one from the deferred purchasing system and converting the message to data usable by the vendor.

Embodiments of the type shown in FIG. 2 are shown in FIG. 3 to optionally include a DPR date (316) and a unique item identification (320). In typical embodiments, the deferred purchasing system stores the DPR date in the DPR record at the time of the record's creation. The date is useful for purposes such as establishing priority among purchaser's whose DPRs are for the same item and when the vendor has an inadequate number of the item in stock.

With regard to the optional unique item identification (320) depicted on FIG. 3, and in embodiments of the type shown in FIG. 2, the deferred purchasing system receives (102) this unique item identification from the purchaser in the form of a responsive input to a prompt at the time the DPR is created. The purchaser typically obtains such a number through sources including hardcopy catalogs, television advertisements, manufacturer websites, vendor websites, and so on.

Also shown on FIG. 3, for various embodiments according to FIG. 2, are fields for payment related information, including a payment information field (344) indicating the preferred method of payment, a payment account identification field (346), a payment account name field (348), and a payment account expiration date field (350). These embodiments include a Parlay-based menu prompt at the time the DPR is created, the prompt requesting the purchaser to enter input as to the preferred method of payment.

In such embodiments for example, when the purchaser (108) hears the preferred method of payment prompt, with its stated options, and then presses the "1" key on the purchaser's telephone keypad, the deferred purchasing system receives (102) the inputted character and records the inputted character in the DPR record. In this case, this input or an input of the numbers "2" or "3" causes an additional prompt for the identification of the account associated with the manner of payment selected. In such embodiments this includes a credit card number, a debit card number, or a checking account number. The menu also prompts the purchaser in such a case for input as to the name (348) and expiration date (350) of the credit card identified. Later, the deferred purchasing system typically reads the "Payment_info" field as an indication that the purchaser desires to pay by credit card when the inputted number is "1," by debit card if the number is "2," and by check if the number is "3." The deferred purchasing system records the account number in the "Payment_acct_id" field, the card number in the "Payment_acct_name" field, and the expiration date in the "Payment_acct_exp" field. The account number, card number, and expiration date are useful for the vendor's billing needs, and for payment verification purposes discussed below.

Similarly, in those embodiments according to FIG. 2, wherein the Parlay user interaction object supports voice recognition, the deferred purchasing system is typically programmed to send an audible message such as: "Please state your intended method of payment from among the following choices: credit card, debit card, check, or COD." If the purchaser responds by verbally inputting the words: "Credit card," the next audible message typically presented to the purchaser is: "Please state the name of the credit card issuer." When the purchaser has verbally responded with the requested name, the next audible message is typically: "Please state the account number on your credit card." After the purchaser verbally responds with the credit card number, the next audible message is typically: "Please state the expiration date shown on your credit card."

Furthermore, as the verbal responses indicating the credit card preference, the credit card issuer name, the credit card number and the credit card expiration date, are inputted, the deferred purchasing system is typically programmed to construct one or more messages from the data resulting from the conversion of these purchaser verbal responses, and send the constructed message to the purchaser with an audible request for confirmation. Following the receipt of a confirming verbal response from the purchaser, the deferred purchasing system stores the data resulting from the conversions of the purchaser's verbal responses in the DPR record.

It should be noted that, for the deferred purchasing system (106) according to embodiments of the present invention, there is no strict requirement that the issue date must be entered at the moment the DPR is created. Alternately, for example, the purchaser (108) specifies a delivery date and the deferred purchasing system is programmed to automatically provide an issue date sufficiently in advance to give the vendor time to meet the delivery date. Alternately, for example, the deferred purchasing system is programmed to prompt the purchaser for an issue date at some point in time after the DPR is created.

The following DDL script is an example of a script useful within the present invention to create a table for aggregating DPR records (300) based upon the DPR described above and illustrated in FIG. 3.

```
create table DPR (
    DPR_id              integer not null,
    Purch_id            integer not null,
    Purch_name          varchar(64),
    Purch_add           varchar(254),
    Purch_phone         integer,
    Purch_email         varchar(64),
    Purch_facs          integer,
    DPR_date            integer,
    DPR_issue           integer,
    Item_id             integer,
    Item_desc           varchar(254),
    Vendor_id           integer,
    Vendor_name         integer,
    Vendor_address      varchar(254),
    Vendor_phone        integer,
    Vendor_email        varchar(64),
    Vendor_facs         integer,
    Deliver_add         varchar(254)
    Payment_info        char( 1)
    Payment_acct_id     integer
    Payment_acct_name   varchar(64)
    Payment_acct_exp    integer
```

Figure 4:
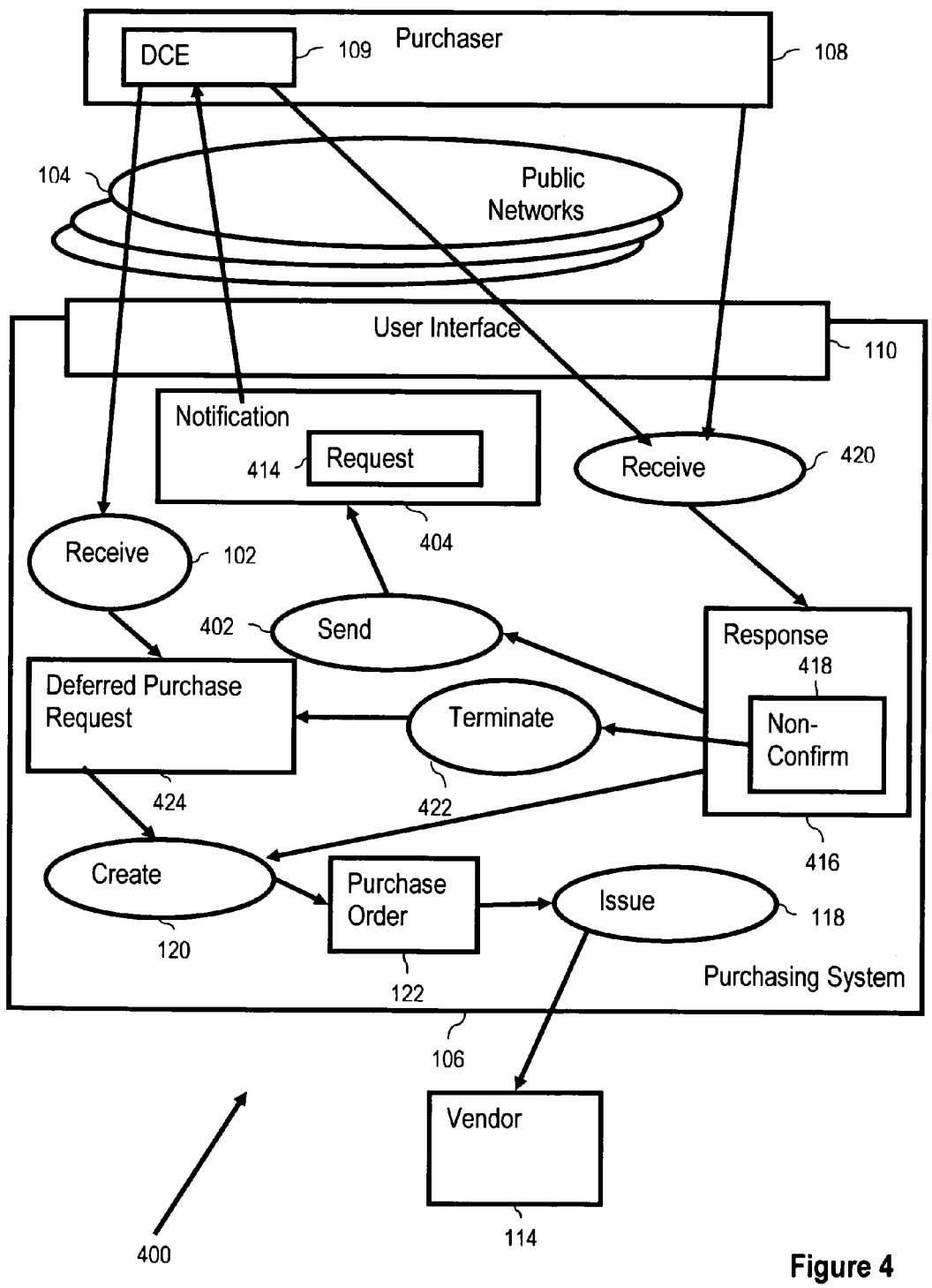
FIG. 4 is a process flow diagram illustrating a purchaser notification aspect of typical example embodiments of the present invention.

Turning now to FIG. 4, additional exemplary embodiments (400) are shown that include sending (402) a notification (404) to the purchaser (108) prior to the issue date. In the embodiment shown, the deferred purchasing system is typically programmed to assign a date for the sending that is prior to the issue date. In some such embodiments the purchaser inputs the date in response to a prompt at the time the DPR is created. In other embodiments, the deferred purchasing system automatically assigns this date based on a previously determined number of days before the issue date.

On the notification date in such embodiments, the deferred purchasing system (106) sends (402) the notification (404) to the purchaser (108), the notification including the issue date and the item description. Purchaser information in the DPR (424) such as the purchaser's electronic mail address (reference 312 on FIG. 3) and the like, allow the notification to be sent using various channels of communication.

In some embodiments of the kind shown in FIG. 4, the deferred purchasing system (106) does not solicit a response from the purchaser to the notification. In other embodiments, the notification optionally includes a request (414) to the purchaser (108) for a pre-issue date confirmation response (416). In these types of embodiments it is typical for the deferred purchasing system to utilize a Parlay-based telephone call, including a user interaction object, to send (402) the notification. In this case, the public network (104) is a typical Public Switched Telephone Network ("PSTN") and the purchaser's DCE (109) is a telephone handset. In this regard, the user interaction object communicates an announcement containing the notification to the purchaser. The announcement is derived from data read from the DPR record, such as the item description data and the issue date data.

In such embodiments, wherein the announcement containing the notification (404) with request (414) for confirmation is communicated by the user interaction object, the communicated announcement typically includes a subsequent menu prompt for telephone keypad input from the purchaser confirming or rejecting the deferred purchase described in the notification announcement. A typical prompt for confirmation in this regard is: "Do you still wish to purchase the item described? If so, press 1. If you wish to terminate the order, press 2."

In such an embodiment, if a non-confirming response (418) is received (420) in response to the prompted request (414) for confirmation, the deferred purchasing system is typically programmed to terminate (422) the DPR (424). The deferred purchasing system is programmed to treat as a non-confirming response the purchaser's responsive input of "2," or any failure to input "1," including hang-ups or the pressing of any key other than "1." In such embodiments, the deferred purchasing system terminates (422) the DPR (424) if no confirming response is received (420), and no purchase order will issue. Conversely, if a confirming response (416) is received (420) the scheduled issue date for the purchase order remains in effect.

For embodiments according to FIG. 4, wherein the notification (404) with request (414) for confirmation is sent (402) to the purchaser by mail, the deferred purchasing system (106) typically merges the item description data and issue date data into a word processing file and prints the word processing file as a hardcopy document for mailing to the purchaser. The word processing file typically includes as part of the notification (404) for confirmation a message that reads: "This message concerns your deferred purchase request, #123456, for a Brand X camcorder, Model XYZ, for which a purchase order is scheduled to issue on Jan. 1, 2003. This message is a request for confirmation of your continued interest in the purchase. Please call 111-111-1111 and confirm your continued interest on or before Dec. 1, 2002. Without such confirmation the deferred purchase request will terminate on Dec. 2, 2002."

After receipt of such notification by mail the purchaser must provide a confirming response (416), the deferred purchasing system typically receiving (420) the response (416) through various methods. For example, the example notification contains a special confirmation telephone number for the purchaser's use. When the call is made by the purchaser to the special number, a Parlay-based user interaction object is typically created that communicates a series of messages to the purchaser that first request authorization input and, in subsequent messages request DPR identification input, and then confirmation input. Typical messages in this regard include:

"Please enter your user account number and PIN."
"Please enter the DPR identification number."
"Please press 1 to confirm your continued wish to purchase the item. Please press 2 to terminate the purchase."

In other embodiments, wherein the notification (404) with request (414) for confirmation is sent (402) to the purchaser by electronic mail, the deferred purchasing system typically merges the item description data and issue date data into an electronic mail file and electronically mails the electronic mail file to the purchaser's electronic mail address using a deferred purchasing system mail server. In such a case, the electronic mail file will also include a request an electronic mail reply to indicate confirmation of the DPR.

In other embodiments of the kind shown in FIG. 4, wherein the notification (404) with request (414) for confirmation is sent (402) to the purchaser by facsimile, the deferred purchasing system merges the item description data and issue date data into an electronic facsimile file and sends (402) the electronic facsimile file to the purchaser's facsimile number. In these embodiments, the public network (104) is a typical Public Switched Telephone Network ("PSTN") and the purchaser's DCE (109) is a facsimile machine. In such embodiments, the only hardcopy of the notification with request produced is the hardcopy generated at the purchaser's facsimile machine. The facsimile typically has the special confirmation telephone number discussed above with respect for confirmation to the embodiments wherein the notification with request is mailed in hardcopy form.

In other embodiments of the kind illustrated in FIG. 4, the notification (404) includes the DPR identification number (reference 302 on FIG. 3). The DPR identification number is useful for referencing by the purchaser (108) in the event the purchaser chooses a traditional form of response such as a personal telephone call or a letter.

Figure 5:
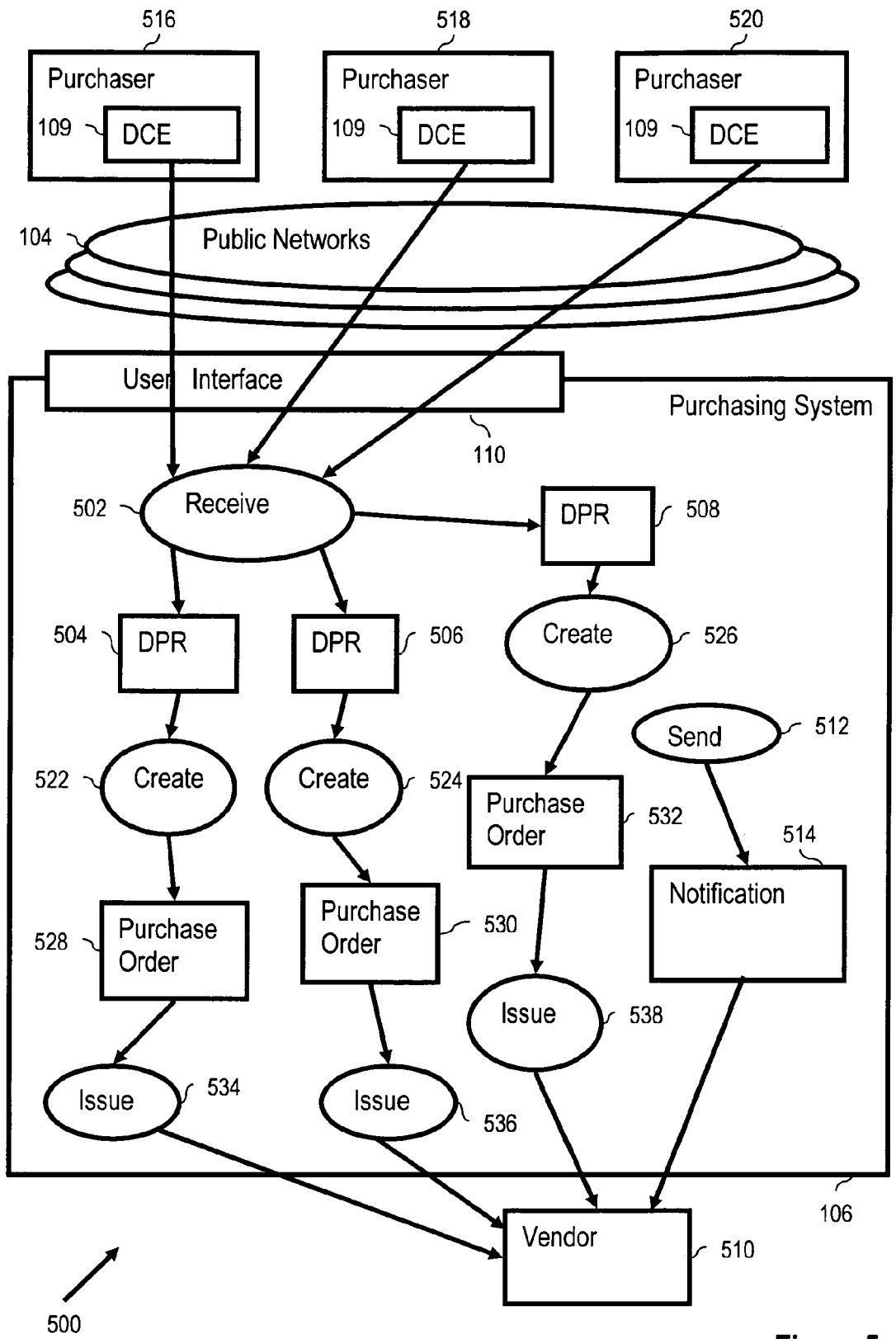
FIG. 5 is a process flow diagram illustrating a vendor notification aspect of typical example embodiments of the present invention.

Turning now to FIG. 5, additional exemplary embodiments (500) are illustrated wherein receiving a DPR further includes receiving (502) a plurality of DPRs (504, 506, 508) from one or more purchasers (516,518,520) for the same item to be purchased from the same identified vendor (510). As records for all such DPRs are created, they are each registered in a table, and the deferred purchasing system is typically programmed to find all DPR records for the same item and same vendor, either periodically or optionally as each DPR record is added to the table.

In such embodiments, and when at least two DPRs for the same item and vendor are so found, the deferred purchasing system sends (512) a notification (514) to the vendor (510), the notification including the issue dates, identifications of the DPRs in the plurality, and an identification of the item, which typically comprises the item identification (reference 320 on FIG. 3) or the item description (reference 322 on FIG. 3). In these embodiments, such a notification provides the vendor with adequate time in which to ensure the availability of a sufficient quantity of the item to honor all the subsequently created (522,524,526) purchase orders (528,530,532) at the time each purchase order issues (534,536,538).

For embodiments of the kind shown in FIG. 5, wherein the notification (514) is sent (512) to the vendor (510) by telephone, the deferred purchasing system typically utilizes a Parlay-based telephone call, including a user interaction object, to send (512) the notification. In such embodiments, the public network (104) is a typical Public Switched Telephone Network ("PSTN") and the purchaser's DCE (109) is a telephone handset. In these embodiments the user interaction object communicates an announcement containing the notification to the vendor. The announcement is derived from data read from the DPR record, such as item description data, issue date data, and DPR identification data. In such embodiments, the vendor can have voice recognition software for receiving audible telephone messages such as this one from the deferred purchasing system and then converting the message to data usable by the vendor. In such embodiments, the notification announcement can state, for example: "Please be aware that our deferred purchasing system has received the following deferred purchase requests for the purchase of a Brand X camcorder, Model XYZ. The following purchase orders are currently scheduled to issue to your company on the date indicated. The purchase orders are PO No. 123456 issuing on Jan. 1, 2003, PO No. 654321 issuing on Jan. 5, 2003, DPR No. 123654 issuing on Jan. 8, 2003"

In other embodiments according to FIG. 5, wherein the notification (514) is sent (512) to the vendor (510) by mail, the deferred purchasing system (106) merges the data representing the issue dates, the identifications of DPRs in the plurality, and the item identifications into a word processing file and prints the file as a hardcopy document. In other embodiments, wherein the notification (514) is sent (512) to the vendor (510) by electronic mail, the deferred purchasing system (106) typically merges the data representing the issue dates, the identifications of the DPRs in the plurality, and the item identifications into an electronic mail file and electronically mails the electronic mail file to the vendor's electronic mail address using a deferred purchasing system mail server.

In still other embodiments of the kind shown in FIG. 5, wherein the notification (514) is sent (512) to the vendor (510) by facsimile, the deferred purchasing system merges the data representing the issue dates, the identifications of the DPRs in the plurality, and the item identifications into an electronic facsimile file, and sends the electronic facsimile file to the vendor facsimile number. In these embodiments, the public network (104) is a typical Public Switched Telephone Network ("PSTN") and the purchaser's DCE (109) is a facsimile machine. In such embodiments, the only hardcopy notification produced is the hardcopy generated at the vendor's facsimile machine.

Figure 6:
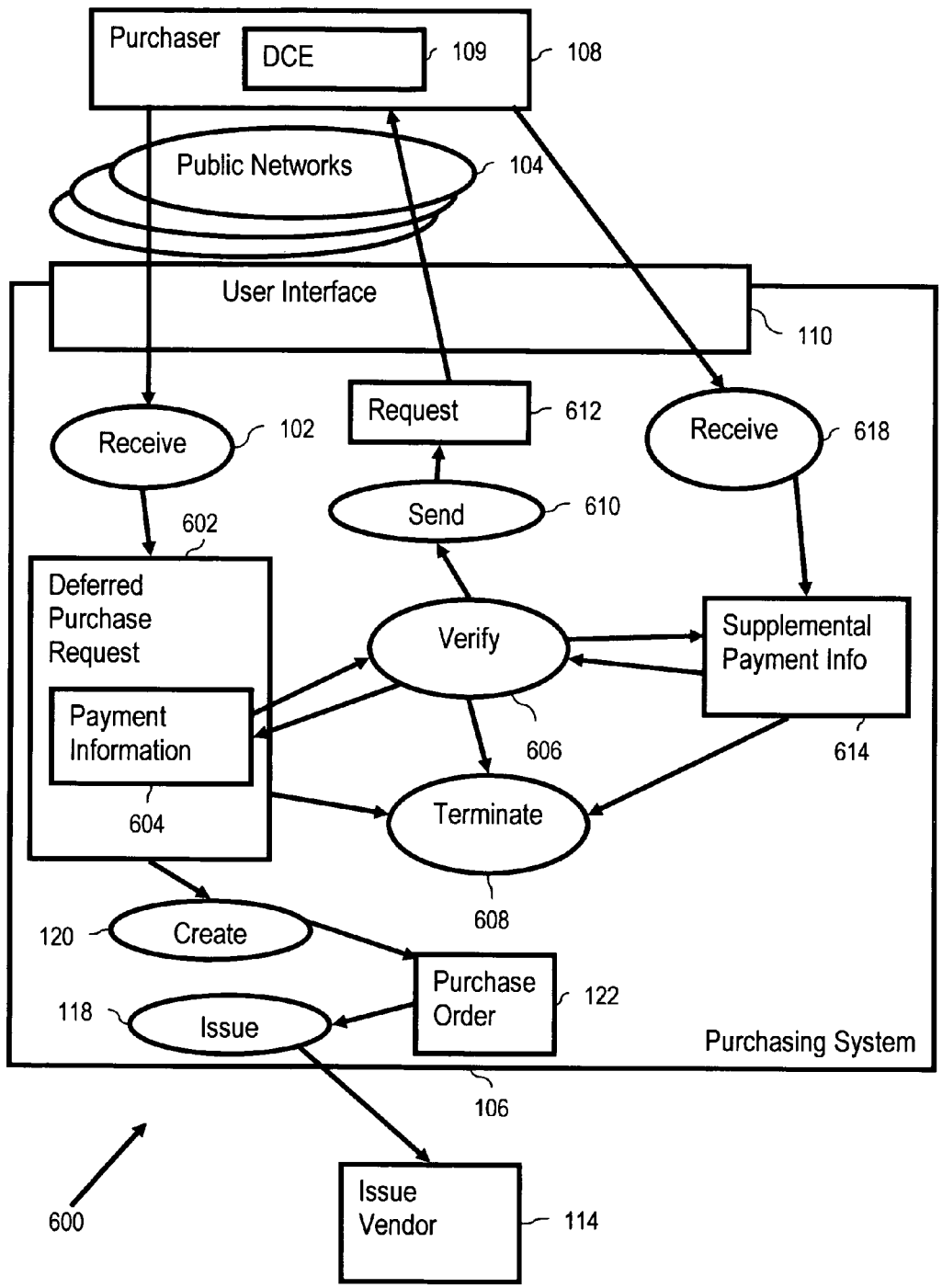
FIG. 6 is a process flow diagram illustrating a payment information verification aspect of typical example embodiments of the present invention.

Turning now to FIG. 6, additional embodiments (600) are shown wherein the DPR (602) includes payment information (604). Such embodiments include verifying (606) the payment information prior to the issue date, and the deferred purchasing system (106) is typically programmed to automatically assign a date for the verification based on a previously determined number of days before the issue date.

In embodiments according to FIG. 6, and at the time of the assigned verification date, the deferred purchasing system verifies (606) the payment information (604) by establishing that credit card, debit card, or checking account previously received (102) from the purchaser is a then current and valid payment method. For example, if the purchaser originally responded to a Parlay user interaction object menu prompt by inputting a "1," the deferred purchasing system receives (102) the input and records the input in a "Payment_info" field of the DPR record. In such an example, the deferred purchasing system interprets this character on the date of verification as an intent to pay by credit card. In such an example, the credit card number was also originally input by the purchaser for recording by the deferred purchasing system in a "Payment_Acct_Id" field of the DPR record, along with a credit card name in a "Payment_acct_name" field, and a credit card expiration date in a "Payment_acct_exp" field. In such a case verifying (606) the payment information (604) includes authorizing a charge against the credit card from a credit authorization agency, using the credit card number, name and expiration date.

Embodiments of the kind illustrated in FIG. 6 typically include terminating (608) the DPR (602) if the payment information (604) verification is unsatisfactory. Unsatisfactory payment information verification in such an example includes the rejection of the charge by the authorization agency.

Embodiments of the kind shown in FIG. 6 also typically include, when the verification is unsatisfactory, sending (610) a request (612) for supplemental payment information (614) from the purchaser (108). For embodiments according to FIG. 6, wherein the request is sent to the purchaser by mail, the deferred purchasing system merges the item description data and issue date data into a word processing file and print the word processing file as a hardcopy document for mailing to the purchaser. The request typically reads: "This message concerns your deferred purchase request, #123456, for a Brand X camcorder, Model XYZ, for which a purchase order was originally scheduled to issue on January, 2003. The payment information you originally provided is no longer satisfactory. Please call 999-999-9999 and provide new payment information on or before Dec. 1, 2002. Without additional payment information the deferred purchase request will terminate on Dec. 2, 2002."

In such embodiments, when a call is made by the purchaser to the special number, a Parlay-based user interaction object is typically created that communicates a series of messages to the purchaser that first requests authorization input and, in subsequent messages requests DPR identification input, and then supplemental payment information input. Typical messages in this regard include:

"Please enter your user account number and PIN."

"Please enter the DPR identification number."

"Please enter your new intended method of payment from among the following choices: For a credit card, press 1. For a debit card, press 2, for a check, press 3, for COD, press 4"

"Please enter the name of the credit card issuer, using the letters represented by numbers on your telephone keypad."

"Please enter the account number on your credit card."

"Please enter the expiration date shown on your credit card."

The deferred purchasing system receives (618) and stores the purchaser's inputted supplemental payment information (606) in the DPR record, replacing the unverifiable payment related information.

In other embodiments, wherein the request (612) for supplemental payment information (614) is sent (610) to the purchaser (108) by electronic mail, the deferred purchasing system, typically merges the item description data and issue date data into an electronic mail file and electronically mails the electronic mail file to the purchaser's electronic mail address using a deferred purchasing system mail server. In such embodiments, the electronic mail file additionally requests an electronic mail reply providing the supplemental payment information. Upon receipt (618) of the reply, the deferred purchasing system typically reads from the electronic mail reply the supplemental payment information (614) and stores the supplemental payment information in the DPR record.

In other embodiments of the kind shown in FIG. 6, wherein the request (612) for supplemental payment information (614) is sent (610) to the purchaser by facsimile, the deferred purchasing system typically merges the item description data into an electronic facsimile file and sends the electronic facsimile file to the purchaser's facsimile number. In these embodiments, the public network (104) is a typical Public Switched Telephone Network ("PSTN") and the purchaser's DCE (109) is a facsimile machine. In such embodiments, the only hardcopy request produced is the hardcopy generated at the purchaser's facsimile machine. The facsimile has the special supplemental payment information telephone number discussed above with respect to the embodiments wherein the request for supplemental payment information is mailed in hardcopy form.

In still other embodiments of the kind shown in FIG. 6, wherein the request (612) for supplemental payment information (614) is sent (610) to the purchaser by telephone, it is typical for the deferred purchasing system to utilize a Parlay-based telephone call, including a user interaction object, to send (610) the request (612). In these embodiments, the public network (104) is a typical Public Switched Telephone Network ("PSTN") and the purchaser's DCE (109) is a telephone handset. In this regard, the user interaction object communicates an announcement containing the request to the purchaser. The announcement is derived from data read from the DPR record, such as the item description data and the issue date data. In such embodiments, the purchaser listens to the message personally and the announcement requests the purchaser to provide supplemental payment information during the telephone call. Typical messages in this regard include:

"This message concerns your deferred purchase request, numbered 123456, for a Brand X camcorder, Model XYZ, for which a purchase order was originally scheduled to issue on January, 2003. The payment information you originally provided is no longer satisfactory. Unless additional payment information is provided during this call, the deferred purchase request will terminate on Dec. 2, 2002."

"In this regard, please enter your new intended method of payment from among the following choices: For a credit card, press 1. For a debit card, press 2, for a check, press 3, for COD, press 4"

"Please enter the name of the credit card issuer, using the letters represented by numbers on your telephone keypad."

"Please enter the account number on your credit card."

"Please enter the expiration date shown on your credit card."

The deferred purchasing system receives (618) the purchaser's inputted supplemental payment information (606) and stores the supplemental payment information in the DPR record, replacing the unverifiable payment related information.

In the embodiments wherein the purchaser (108) provides supplemental payment information (614), the purchaser's input is stored in the DPR record (602). With the supplemental payment information recorded in the DPR, the deferred purchasing system in such examples verifies (606) the supplemental payment information. If the purchaser fails to provide supplemental payment information, or provides unverifiable supplemental payment information, the DPR is terminated (608).

Automated Vendor Selection

Figure 7:
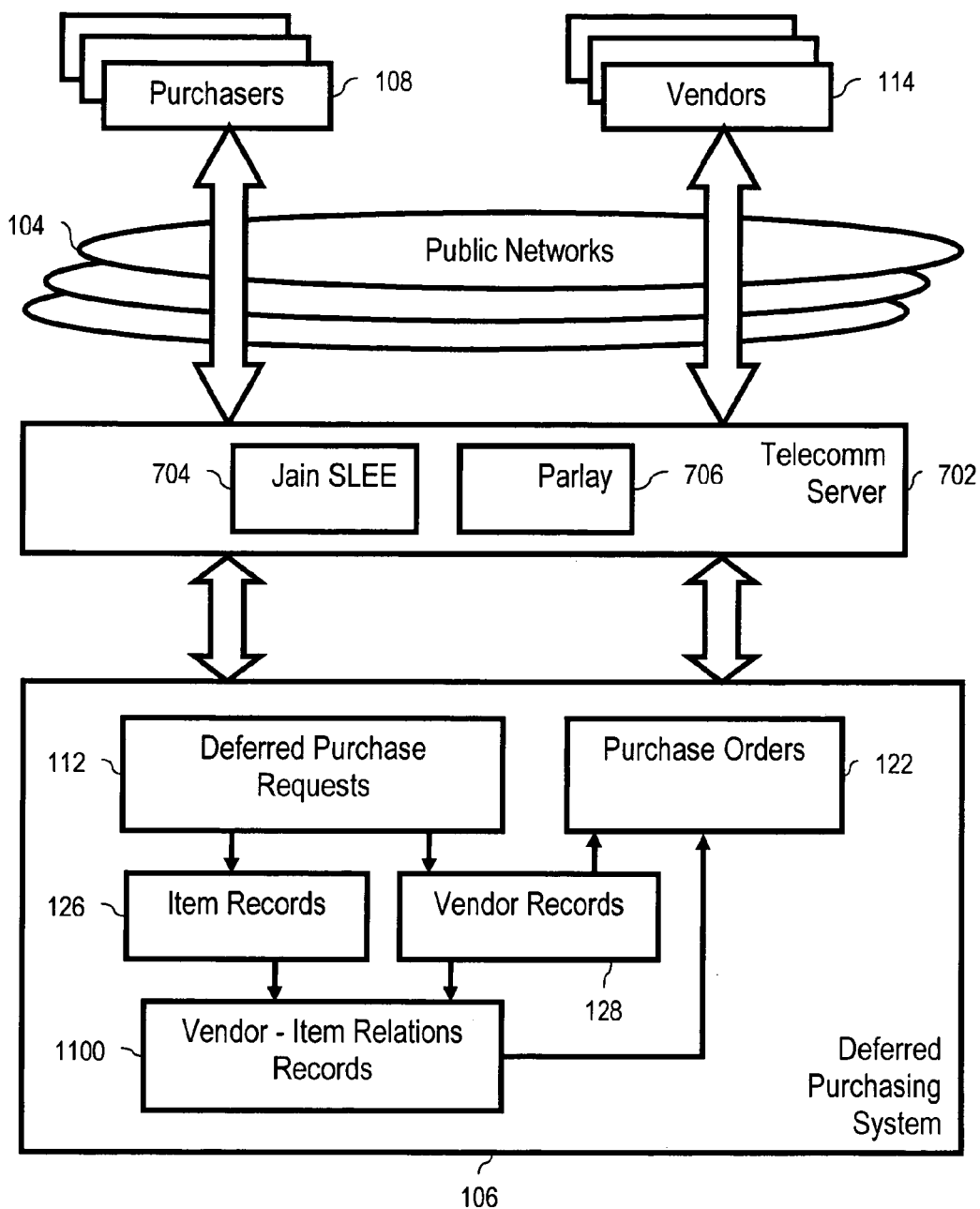
FIG. 7 is a block diagram illustrating the overall structure of an example embodiment of the present invention utilizing telecomm-based data communications.

FIG. 7 sets forth a block diagram depicting a further example of an overall structure of a deferred purchasing system according to an exemplary embodiment of the present invention. The deferred purchasing system according to FIG. 7 accepts from purchasers (108) deferred purchase requests (112) ("DPRs") through public networks (104) into the deferred purchasing system (106). Embodiments of this kind include item records (126) identifying items available for acquisition through the use of DPRs and vendor records (128) identifying vendors to whom purchase orders (122) may be issued. Embodiments of the kind shown in FIG. 7 include vendor-item relations records (1100) identifying items available for acquisition from particular vendors, often including a price at which a particular vendor represents a willingness to sell a particular item.

Figure 8:
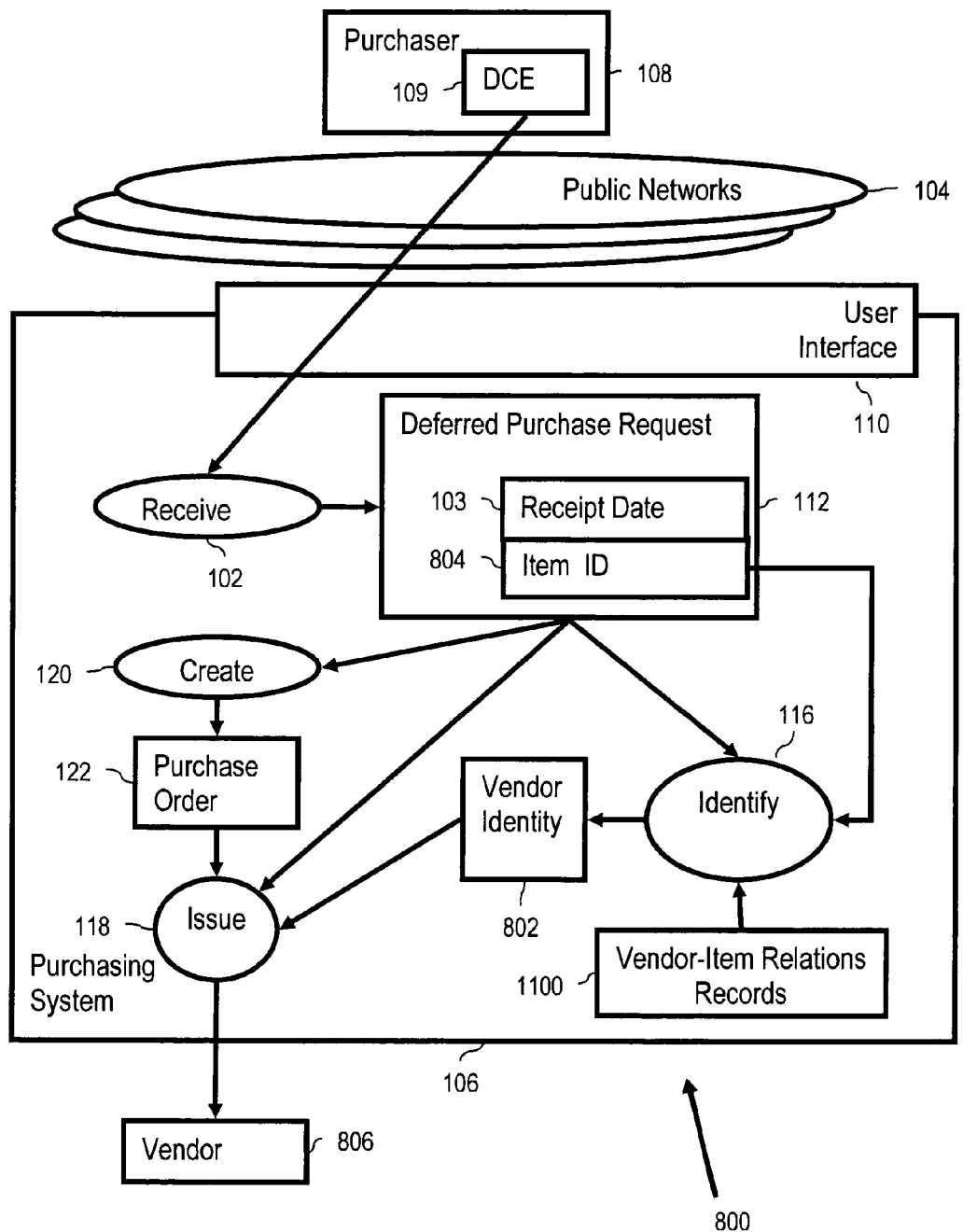
FIG. 8 is a process flow diagram illustrating a typical example embodiment of the present invention.

FIG. 8 sets forth a data flow diagram depicting an additional exemplary embodiment (800) of the present invention as a method for operating a publicly accessible deferred purchasing system. Embodiments of the kind shown in FIG. 8 include receiving (102), on a receipt date (103), in a publicly accessible (104) deferred purchasing system (106), from a purchaser (108) through a user-interface (110), a deferred purchase request ("DPR") (112) for an item to be purchased. Typical embodiments include identifying (116) a vendor (802,806) and issuing (118), in dependence upon the DPR (112), a purchase order (122) to the vendor (806) on a date subsequent to the receipt date (103).

In purchasing systems utilizing methods of the kind shown in FIG. 8, receiving (102) a DPR (112) includes a purchaser's accessing the deferred purchasing system (106) by placing a telephone call to the deferred purchasing system. In the example of access through telephone, the public network (104) is typically a Public Switched Telephone Network ("PSTN") and the purchaser's data communications equipment or "DCE" (109) is a telephone handset. In the example of telephone access, receiving (102) a DPR (112) is carried out through use of a telecommunications execution environment, such as, for example, Parley. More particularly, a Parlay server establishes a call and creates a Parlay user interaction object for a user interaction with the purchaser. The user interaction object communicates an audible menu to the purchaser, the menu comprising prompts for a series of purchaser inputs from the purchaser's telephone keypad. The user interaction object is capable of reading item records, such as those depicted in FIG. 9, for example, and communicating to a purchaser the item identifications of items available for purchase through a deferred purchasing system. The deferred purchasing system receives the purchaser inputs and stores at least some of the purchaser inputs as data in a DPR (112). A detailed example of a data structure for DPRs useful in embodiments according to FIG. 8 is set forth in FIG. 3.

In embodiments of the kind shown in FIG. 8, a DPR (112) typically includes an item identification (804) for the item to be purchased and the deferred purchasing system (106) identifies (116) a vendor in dependence upon the item identification. In such embodiments the deferred purchasing system (106) typically includes an item table having a structure, for example, of the kind described at reference 900 in FIG. 9. In such embodiments, each record in an item table represents an item available for purchase through the deferred purchasing system. Each item record includes a unique item identification stored in an "Item_id" field (902), an item type stored in an "Item_type" field (904), an item description stored in an "Item_desc" field (906), and an item weight in an "Item_weight" field (908). In such embodiments, the item identification (804) corresponds with the "Item_id" field (902) in the item table. In many embodiments, the purchasing system treats the "Item_id" field as a primary key for the item table.

Deferred purchasing systems according to FIG. 8, typically include a vendor table (1000). FIG. 10 depicts an example data structure vendor record in a vendor table (1000), where each record represents a vendor to whom purchase orders may be issued through the deferred purchasing system. Each vendor record includes, for example, a unique vendor identification stored in a "Vendor_id" field (1002), a vendor's name stored in a "Vendor_name" field (1004), a vendor's telephone number stored in a "Vendor_phone" field (1006), an vendor's facsimile telephone number stored in a "Vendor_facs" field (1008), an electronic mail address stored in a "Vendor_email" field (1010), a website address stored in a "Vendor_web" field (1012), a "Vendor mail" field (1014), and a physical address stored in several fields. The physical address typically includes a street name stored in a "Vendor_street" field (1016), a city name stored in a "Vendor_city" field (1018), a state name stored in a "Vendor_state" field (1020), a mail code stored in a "Vendor_zip" field (1022), and a country stored in a "Vendor_country" field (1024). In such embodiments the "Vendor_id" field (1002) is a primary key.

For some embodiments of the kind shown in FIG. 8, identifying (116) a vendor (802) includes finding a vendor identification (802) using an intermediate table having a structure such as, for example, the Vendor-Item Relations Table (1100) shown in FIG. 11. As shown in FIG. 11, the Vendor-Item Relations Table includes vendor identifications stored in a Vendor_id field (1102), item identifications stored in an Item_id field (1104), and vendor item prices stored in an "Item_price" field (1108). In such embodiments, the Vendor-Item Relations Table associates the Item_id (902) of the item table (900) and Vendor_id (1002) of the vendor table (1000), the tables being related by such fields in a many-to-many relationship.

More particularly, for example, a vendor identified by a Vendor_id (1102) in the Vendor-Item Relations Table (1100) associates with at least one item in at least one record in the Vendor-Item Relations Table. In each such record, the Vendor-Item Relations Table identifies each of the at least one items by an Item_id (1104). In this manner, the Vendor-Item Relations Table indicates all items presented through the deferred purchasing system by a particular vendor. Similarly, an item identified by an Item_id (1104) in the Vendor-Items Relations Table associates with at least one vendor in at least one record in the Vendor-Item Relations Table. In each such record the Vendor-Item Relations Table identifies each of the at least one vendors by a Vendor_id (1102), the Vendor-Item Relations Table thus indicating all vendors that sell the item. A Vendor-Item Relations Table record stores each combination of a vendor and an item, and also includes the vendor item price—the price presented by that vendor for that item.

In typical embodiments according to FIG. 8, the Vendor-Item Relations Table (1100) relates to the item table (900) through an item identification foreign key which comprises the "Item_id" field (1104) of the Vendor-Item Relations Table. The item identification foreign key references the "Item_id" field (902) of the item table. Similarly, the Vendor-Item Relations Table (1100) relates to the vendor table (1000) through a vendor identification foreign key which comprises the "Vendor_id" field (1102) of the Vendor-Item Relations Table. The vendor identification foreign key references the "Vendor_id" field (1002) of the vendor table. By including both vendor identifications (1102) and item identifications (1104), a vendor-item relations table, such as the exemplary table depicted in FIG. 11, implements a many-to-many relation among vendors and items, so that it is possible by use of a such a table, to identify a vendor for an item by finding in such a table a record having a particular item identification.

In a typical application of embodiments of the kind shown in FIG. 8, the deferred purchasing system identifies (116) the vendor (806) by locating Vendor-Item Relations Table (1100) records that include the item identification in the Item_id field (1104) and then selecting a vendor from the vendors identified in the Vendor_id field (1102) for such records. In some embodiments, the deferred purchasing system is programmed to select the first vendor so located in the Vendor-Item Relations Table. In other embodiments, as discussed below, the deferred purchasing system utilizes various algorithms for making the vendor selection from the vendors identified in the Vendor-Item Relations Table.

Rather than describing vendors as 'offering' items for sale, vendors are described as 'presenting' items for sale through the deferred purchasing system, 'Offer' is a technical legal term indicating generally that an offeror is conferring upon an offeree a right to bind the offeror in an enforceable contract by accepting an offer. Vendors' presentations of items through a deferred purchasing may, at some stage in proceedings, mature into legally effective offers. The definition of where such a stage might occur is not a limitation of this invention, however. There is no requirement within the invention, that any presentation of an item or an item price from a vendor indicates an 'offer' to sell an item on any particular terms, including any item price that a vendor might present for an item through a deferred purchasing system.

Figure 12:
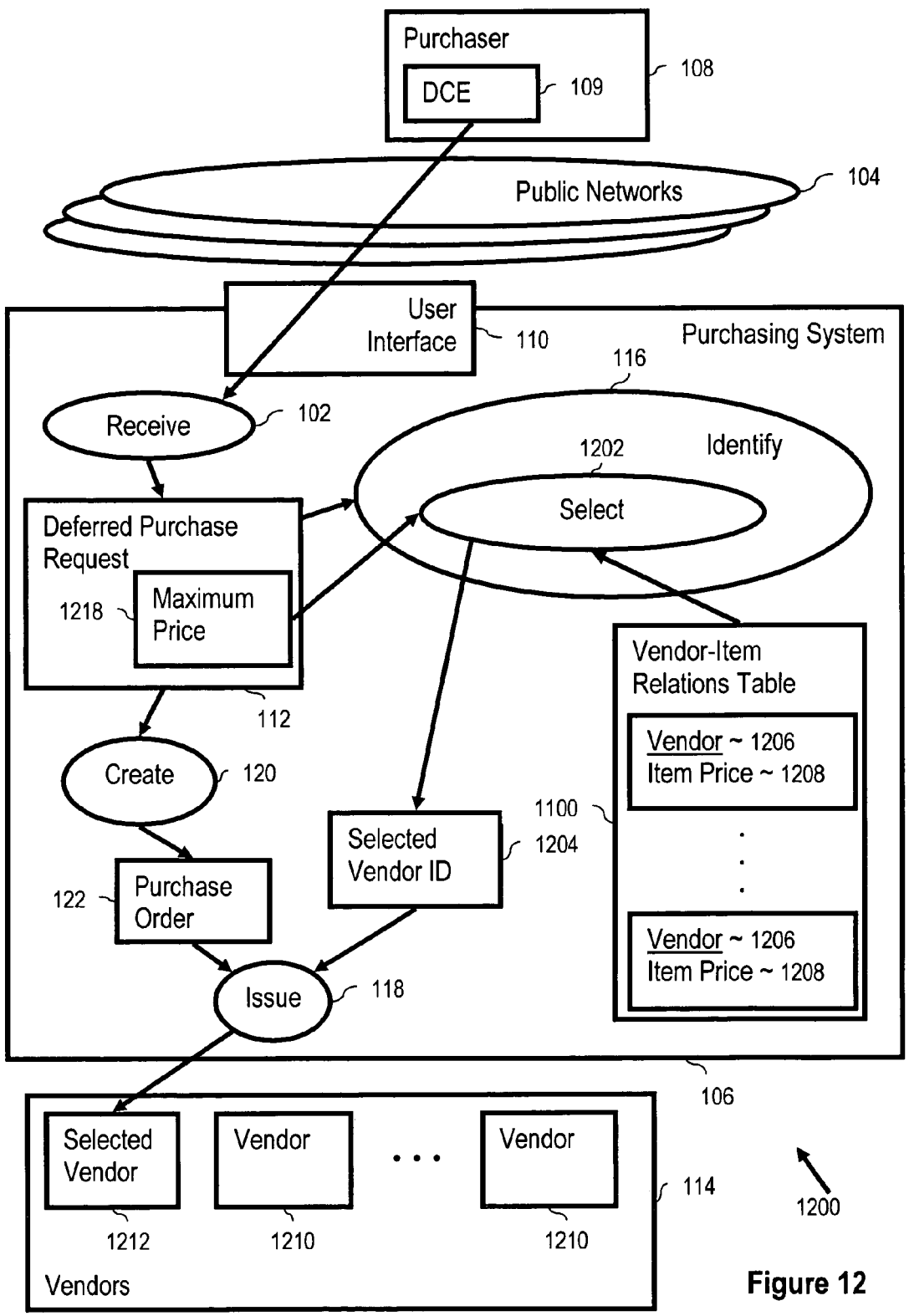
FIG. 12 is a process flow diagram illustrating a price based vendor identification aspect of typical example embodiments of the present invention.

FIG. 12 sets forth a data flow diagram illustrating additional exemplary embodiments (1200) of the present invention in which identifying (116) a vendor includes selecting (1202) a selected vendor (1204) in dependence upon vendor item prices (1208). In such embodiments, the deferred purchasing system is sometimes programmed to identify a vendor by finding vendors (1210) that present a particular item for sale through the deferred purchasing system as represented by records in a Vendor-Item Relations Table (1100). Such vendors (1210) have records in a vendor-item relations table, as shown for example in FIG. 11, associating a Vendor_id (1206) with an Item_id (1104) that represents item presented for sale through the system. A deferred purchasing system according to FIG. 12 selects a vendor from among the vendors found to have vendor-item relations records with an Item_id identifying the particular item, the selected vendor (1212) being one presenting a vendor item price (1208) that is the lowest among the vendors who present the item through the deferred purchasing system.

In embodiments of the kind shown in FIG. 12, the vendor item price (1208) for a presenting vendor (1210) is typically stored in the "Item_price" field (1108) of a Vendor-Item Relations Table (1100, FIG. 11) record that includes the vendor's identification and the item identification for the item. Once the deferred purchasing system locates the Vendor-Item Relations Table records that include vendor identifications for vendors (1210) presenting the item, the deferred purchasing system compares the item prices (1208) stored in the "Item_price" column of the Vendor-Item Relations Table for each such record. The comparison finds the lowest vendor item price (1206) and the vendor identification stored in the "Vendor_id" field (1102) of the record that includes the lowest vendor item price is the selected vendor identity (1204).

In a further exemplary embodiment of the kind shown in FIG. 12, a DPR (112) includes a maximum price (1218). In some embodiments of this kind, a purchaser (108) provides a maximum price through a telephone keypad in response to an audible menu prompt. In such embodiments, the deferred purchasing system typically prompts the purchaser (108) with an audible menu prompt such as, for example:

Please indicate whether you wish to limit the selection of vendors to those presenting the item at a price no greater than a maximum price that you are willing to pay for the item. If you wish to limit the vendor selection in this manner enter the maximum price amount using the numbers shown on your telephone keypad, or press the pound key if you do not.

A deferred purchasing system according to such embodiments typically records the purchaser's response as data in a DPR record (112). If the purchaser responds by pressing "#," then the deferred purchasing system selects from vendors presenting the item with no limitation based on a maximum price. If the purchaser responds by pressing numbers on the telephone keypad representing a maximum price amount, the deferred purchasing system typically identifies (116) a vendor by selecting (1202) a vendor (1212) from vendors (1206) shown in the Vendor-Item Relations Table to present the item. In this exemplary embodiment, the deferred purchasing system compares the maximum price to the vendor item price (1208) associated with an presenting vendor, and limits the selection to those vendors presenting a vendor item price (1208) that is not greater than the maximum price.

In various embodiments according to FIG. 12, embodiments in which the DPR includes a maximum price (1218) and the deferred purchasing system selects from the Vendor-Item Relations Table the first vendor presenting the item, the deferred purchasing system limits the selection to the first vendor presenting the item at a vendor item price no greater than the maximum price. In other embodiments, embodiments in which the DPR includes a maximum price (1218) and the deferred purchasing system selects from the Vendor-Item Relations Table the vendor presenting the item at the lowest vendor item price (1208), the deferred purchasing system limits the selection to vendors presenting the item at the lowest vendor item price, the vendor item price being no greater than the maximum price.

In some embodiments according to FIG. 12, the vendor item price (1208) includes typical additions to a base price for the item, such as sales tax, shipping, handling, and the like. In some embodiments the vendor item price represents the total price for the item, while in other embodiments the vendor item price is the base price for the item before such additions. A deferred purchasing system according to such embodiments typically determines the shipping portion of the total price by finding the item weight in "Item_weight" field (908, FIG. 9) in an item table (900), and calculating the shipping cost based on the item weight.

Figure 13:
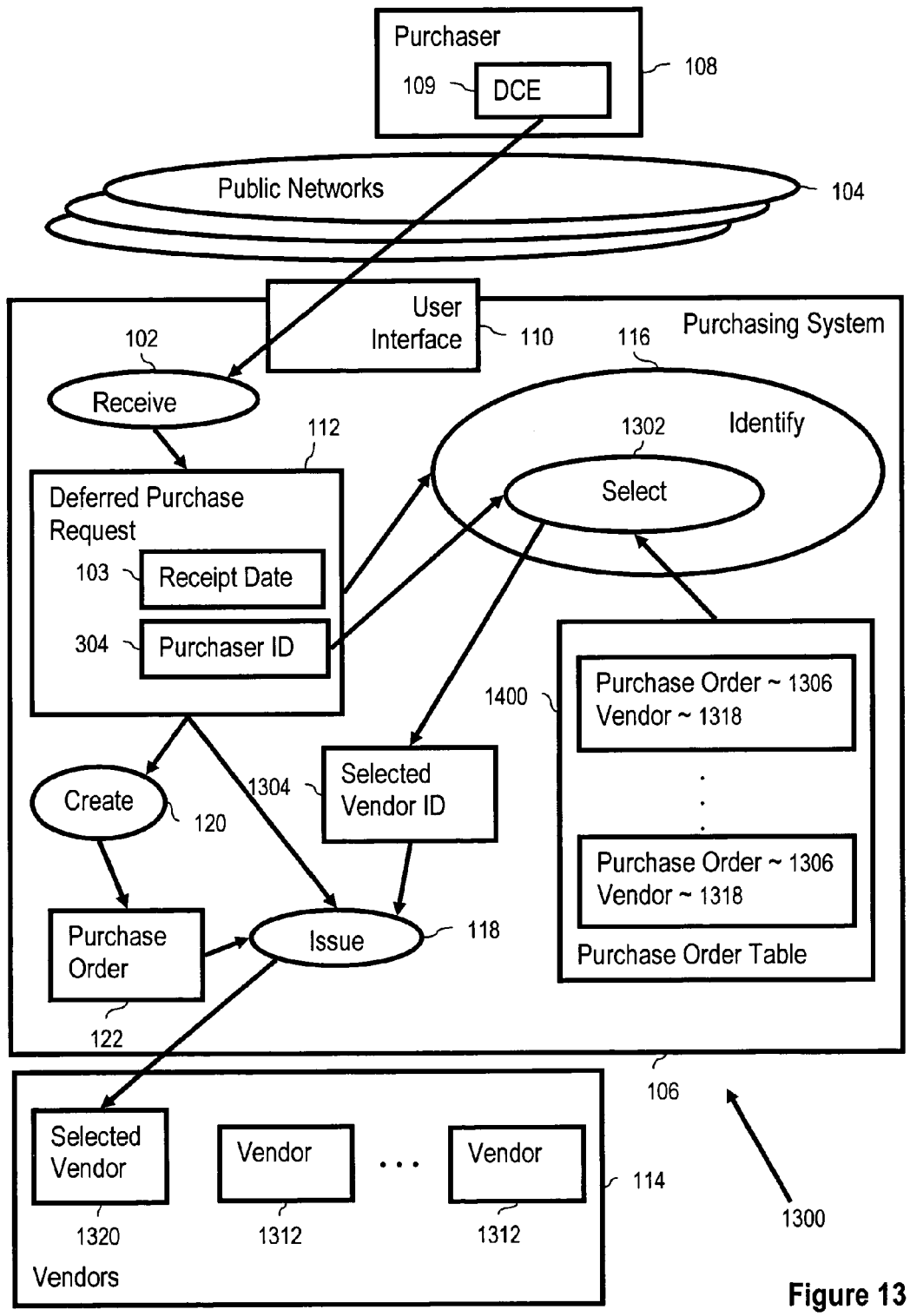
FIG. 13 is a process flow diagram illustrating a purchase order based vendor identification aspect of typical example embodiments of the present invention.

FIG. 13 sets forth a data flow diagram depicting additional exemplary embodiments (1300) of the invention in which a plurality of vendors (1312) present an item and identifying (116) a vendor includes selecting (1302) a selected vendor (1304,1320) in dependence upon purchase orders (1306). The deferred purchasing system is typically programmed to store purchase orders from previous deferred purchases as records in a Purchase Order Table (1400), for which an example data structure is depicted in FIG. 14. Each purchase order record (1306) in the Purchase Order Table typically includes a unique identification stored in a "Purchase_order_id" field (1402), a vendor identification for the vendor associated with the purchase order stored in a "Vendor_id" field (1404), a purchaser identification for the purchaser associated with the purchase order stored in a "Purchaser id" field (1406), and a purchase order history for each purchase order stored in a "Purchase_order history" field (1408). The "Purchase_order_ history" field typically includes the number "1" as an indication that the purchase order was issued and a deferred purchase completed, or the number "2" if the purchase order was cancelled.

In some embodiments of the kind shown in FIG. 13, the Purchase Order Table (1400) relates to the item table (900) through a vendor identification foreign key which comprises the "Vendor_id" field (1402) of the Purchase Order Table. The item identification foreign key references the "Vendor_id" field (1002) of the vendor table.

In some embodiments of the kind shown in FIG. 13, the deferred purchasing system prompts the purchaser (108) to input an indication as to whether the purchaser wants the vendor to be identified based on previous purchase orders involving the purchaser. For example, the deferred purchasing system typically prompts the purchaser with an audible menu prompt such as:

Please indicate whether you wish to limit the selection of vendors to vendors with which you have completed purchases for one or more items in the past using this deferred purchasing system. Press 1 if you do wish to limit the selection to such vendors, or 2 if you do not.

A deferred purchasing system according to FIG. 13 typically records a purchaser's inputted response as data in a DPR record (112). In such embodiments, if the purchaser responds by pressing "2," then the deferred purchasing system selects from vendors presenting the item with no limitation as to previous transactions with the purchaser. If the purchaser responds by pressing "1," the deferred purchasing system typically responds to the affirmative indication by locating from the Vendor-Item Relations Table (1100) the vendors (1312) presenting the item, and selecting (1304) a vendor (1320) from such presenting vendors (1312) who is represented in the Purchase Order Table (1400) by a vendor identification (1318) stored in the "Vendor_id" field in a purchase order (1306) recorded in the Purchase Order Table, the selection being further limited to the vendors in such purchase order records having a "1" stored in the "Purchase_order_history" field (1408) of the record. In such embodiments the "1" indicates that a previous purchase order was issued to the vendor (1320).

In another example of the kind of embodiments shown in FIG. 13, the deferred purchasing system prompts the purchaser (108) to input an indication as to whether the purchaser wants the vendor to be selected from vendors that are not associated with previously cancelled purchase orders involving the purchaser. For example, the deferred purchasing system may prompt the purchaser with an audible menu prompt such as:

Please indicate whether you wish to limit the selection of vendors by excluding vendors identified with respect to any of your previous deferred purchases that were terminated prior to the completion of the transaction. Press 1 if you do wish to limit the selection by excluding such vendors, or 2 if you do not.

A deferred purchasing system according to this kind of embodiment typically records the purchaser's response as data in a DPR record (112). In such embodiments, if the purchaser responds by pressing "2," then the deferred purchasing system selects from vendors presenting the item with no limitation as to previously cancelled transactions with the purchaser. If the purchaser responds by pressing "1," the deferred purchasing system limits the selection to vendors (1318) that are not associated with cancelled purchase orders (1306) recorded in the Purchase Order Table (1400), as indicated by the number "2" in the "Purchase_order_history" field (1408) of the Purchase Order Table.

In other embodiments according to FIG. 13, wherein the deferred purchasing system limits the selection to vendors (1318) associated with purchase orders (1306) recorded in the Purchase Order Table (1400), the deferred purchasing system typically utilizes other algorithms to complete the vendor selection in the event more than one vendor is so associated with such recorded purchase orders. In such a case, the deferred purchasing system typically completes the vendor selection by comparing the vendor item prices (reference 1208 on FIG. 12) associated with the vendors with respect to the item, as recorded in the Vendor-Item Relations Table (1100), and then selecting the lowest price vendor.

Figure 15:
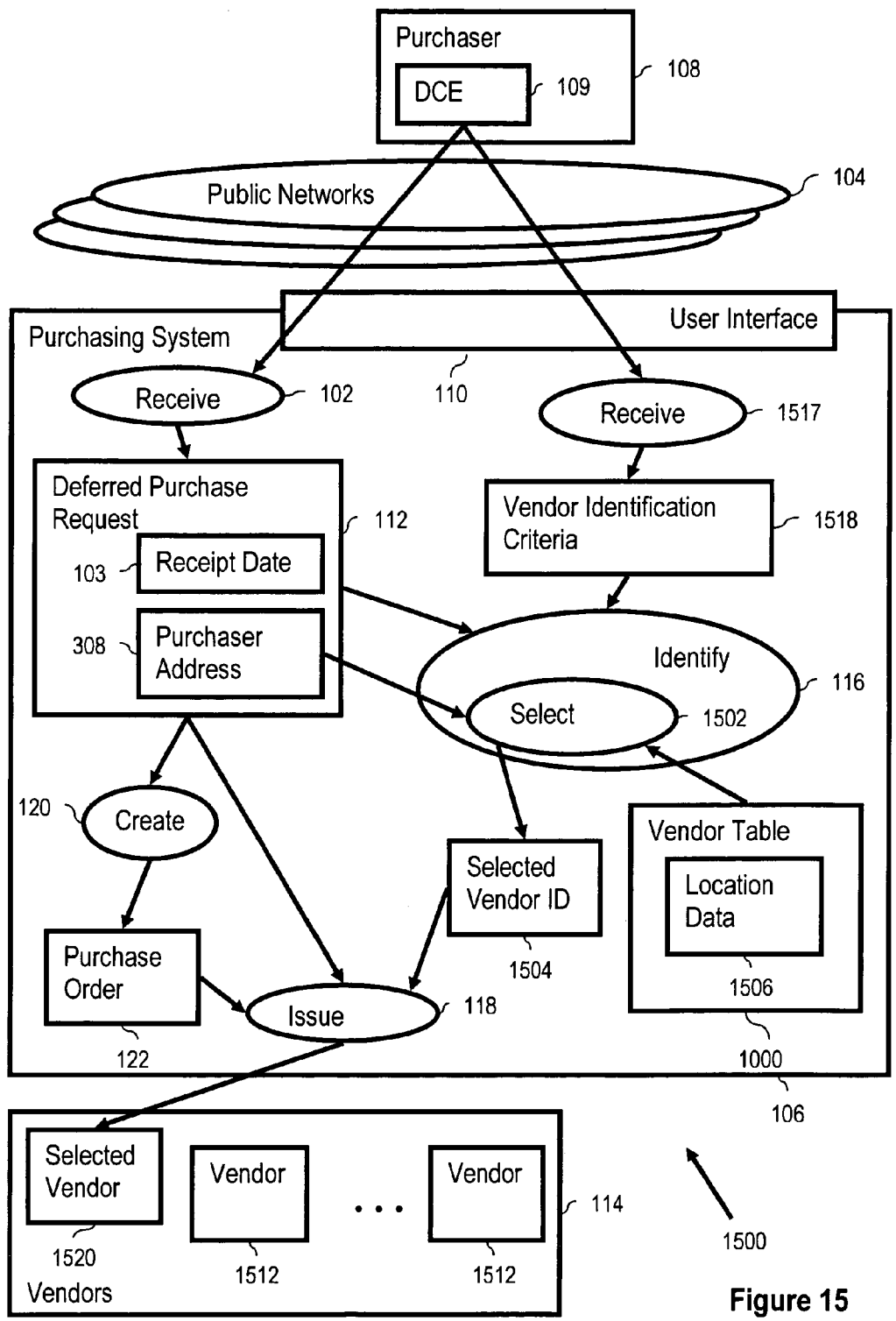
FIG. 15 is a process flow diagram illustrating a vendor proximity based vendor identification aspect of typical example embodiments of the present invention.

FIG. 15 sets forth a data flow diagram depicting additional exemplary embodiments (1500) of the present invention in which more than one vendor (1512) presents an item and vendor records in the vendor table (1000) typically include location data (1506) and vendor identifications (1002) for the vendors. In such embodiments the deferred purchasing system typically identifies a vendor by selecting (1502) a selected vendor (1504,1520) in dependence upon proximity of a vendor to the purchaser (108).

Referring again to FIG. 10, the vendor table (1000) is shown to include a record for each vendor that includes the vendor identification for the vendor stored in the "Vendor_id" field and vendor location data for the vendor. Location data typically includes the name of the vendor's city stored in the "Vendor_city" field (1016), the name of the vendor's state stored in the "Vendor_state" field (1018), the name of the vendor's country stored in the "Vendor_country" field (1022), and the vendor's zip code stored in the "Vendor_zip" field (1020). Similar purchaser address information is typically provided by the purchaser at the time a DPR (112) is created, or optionally, when a purchaser establishes a purchaser's account.

Deferred purchasing systems according to FIG. 15 typically prompt a purchaser (108) to enter, as telephone keypad input, an indication as to whether the purchaser only wants to do business with vendors that operate in proximate geographical locations. Such deferred purchasing systems may prompt a purchaser with an audible menu prompt such as:

Please indicate whether you wish to limit the selection of vendors to vendors residing in your country, by pressing 1 if you do wish to limit the selection to your country, or 2 if you do not.

If the purchaser presses "2" the deferred purchasing system ignores vendor proximity while identifying a vendor. If the purchaser presses "1" in response to such a prompt, the deferred purchasing system typically continues with another audible menu prompt such as:

Please indicate whether you wish to limit the selection of vendors to vendors residing in your state, by pressing 1 if you do wish to limit the selection to your state, or 2 if you do not.

If the purchaser responds by pressing "2," then the deferred purchasing system selects from vendors in the same country as the purchaser, with no further proximity limitation. If the purchaser responds by pressing "1," the deferred purchasing system typically continues with another audible menu prompt such as:

Please indicate whether you wish to limit the selection of vendors to vendors residing in your city, by pressing 1 if you do wish to limit the selection to your city, or 2 if you do not.

If the purchaser responds by pressing "2," then the deferred purchasing system selects from vendors in the same state as the purchaser, with no further proximity limitation. If the purchaser responds by pressing "1," the deferred purchasing system typically continues with another audible menu prompt such as:

Please indicate whether you wish to limit the selection of vendors to vendors residing in your zip code area, by pressing 1 if you do wish to limit the selection, or 2 if you do not.

If the purchaser responds by pressing "2," then the deferred purchasing system selects from vendors in the same city as the purchaser, with no further proximity limitation. If the purchaser responds by pressing "1," the deferred purchasing system limits the selection of vendors to those residing in the same zip code area as the purchaser.

Such a deferred purchasing system typically records the purchaser's inputted responses to such prompts as data in a DPR record (112). In such embodiments, embodiments in which the purchaser has responded with telephone keypad input to indicate that the purchaser desires to limit the selection of vendors to those residing in the purchaser's same city, a deferred purchasing system typically finds vendors presenting the item from the Vendor-Item Relations Table (1100) and then, using the vendor table (1000), selects (1502) from such presenting vendors (1512) a vendor (1520) having a city name stored in the "Vendor_city" field in the vendor table that matches the purchaser's city. In so selecting, the deferred purchasing system typically reads the selected vendor's identification (1504) stored in the "Vendor_id" (1002) field in the vendor table, and utilizes the vendor identification when issuing the purchase order (122). In the event more than one presenting vendor operates in the same city as the purchaser, the deferred purchasing system typically utilizes other algorithms to complete the vendor selection. The deferred purchasing system in such a case may complete the process of selecting a vendor, for example by comparing vendor item prices (reference 1208 on FIG. 12) presented by vendors for an item, as recorded in the Vendor-Item Relations Table (1100 on FIG. 11), selecting the vendor presenting the lowest price for the item.

It is clear from our discussion of the examples illustrated in FIGS. 8, 12, 13, and 15, that deferred purchasing systems according to embodiments of the present invention identify vendors based on a variety of vendor identification criteria. For example, embodiments according to FIG. 12 identify vendors based on vendor item price criteria such that the deferred purchasing system utilizes algorithms based on vendor item prices (reference 1208 on FIG. 12). In another example, embodiments according to FIG. 13 identify vendors based on previous purchase order criteria such that the deferred purchasing system utilizes algorithms based on the purchaser's previous purchase orders (reference 1306 on FIG. 13) stored in the Purchase Order Table (1400). In another example, embodiments according to FIG. 15 identify vendors based on vendor proximity criteria such that the deferred purchasing system utilizes algorithms based on vendor location data (reference 1506 on FIG. 15) stored in the vendor table (1000).

In some such embodiments, and as illustrated in FIG. 15, identifying a vendor includes receiving such (1517) vendor identification criteria (1518) from the purchaser (108), and identifying (116) a vendor in dependence upon the vendor identification criteria. For example, as discussed with respect to FIG. 15 above, the deferred purchasing system prompts the purchaser for input as to whether the selection of the vendor should be based on, or limited by, the vendors' locations, as represented by vendor location data (1506) in the vendor table (1000).

Another example is shown in FIG. 12, wherein the vendor identification criteria is the vendor item price (1208). In some embodiments according to FIG. 12, the deferred purchasing system audibly prompts the purchaser for input as to whether the purchaser wants the deferred purchasing system to identify a vendor by selecting (1202) a vendor (1204,1212) having the lowest vendor item price. A typical audible menu prompt includes prompts such as:

If you wish to have a vendor chosen on the basis of the lowest vendor price for the item, press 1, if not, press 2.

Typically, the deferred purchasing system records the purchaser's inputted response as data in the DPR record. In such embodiments, if the purchaser inputs a "2" on the telephone keypad, the deferred purchasing system does not use the vendor item price as vendor identification criteria. If the purchaser inputs a "1," the deferred purchasing system identifies vendors based on the received vendor identification criteria in this example the vendor item price criteria.

In other embodiments, the deferred purchasing system is typically programmed to include vendor identification criteria without receiving such criteria from the purchaser. In some embodiments, for example, the deferred purchasing system automatically identifies a vendor, by first finding vendors that present the item, then selecting from the presenting vendors those vendors that present the lowest vendor item price, then, if necessary, selecting the vendor in closest proximity to the purchaser. Persons of skill in the art will immediately recognize that the order of priority for the various vendor identification criteria is readily reorderable to suit the preferences of a deferred purchasing system administrator, and that the deferred purchasing system, in some embodiments, automatically combines vendor identification criteria from both the purchaser and the deferred purchasing system administrator.

This disclosure discusses many examples of communications with purchasers in terms of telecommunications, that is, automated audible menus, telephone keypad input from purchasers, and so on. FIG. 7 depicts a data communications architecture in which a telecommunications server (702) implements either a Jain SLEE environment (704) or a Parlay environment (706) for telecommunications with both purchasers (108) and vendors (114). As described earlier, it is, for example a Java object operating in a Java SLEE environment that implements the user interface (110 on FIG. 15, for example). The user interface (110) is a combination of software and computer hardware, such as a Jain SLEE environment running on a telecom server, that prompts purchasers with audible menus and accepts purchaser response in the form of keypad inputs or voice recognition.

Figure 16:
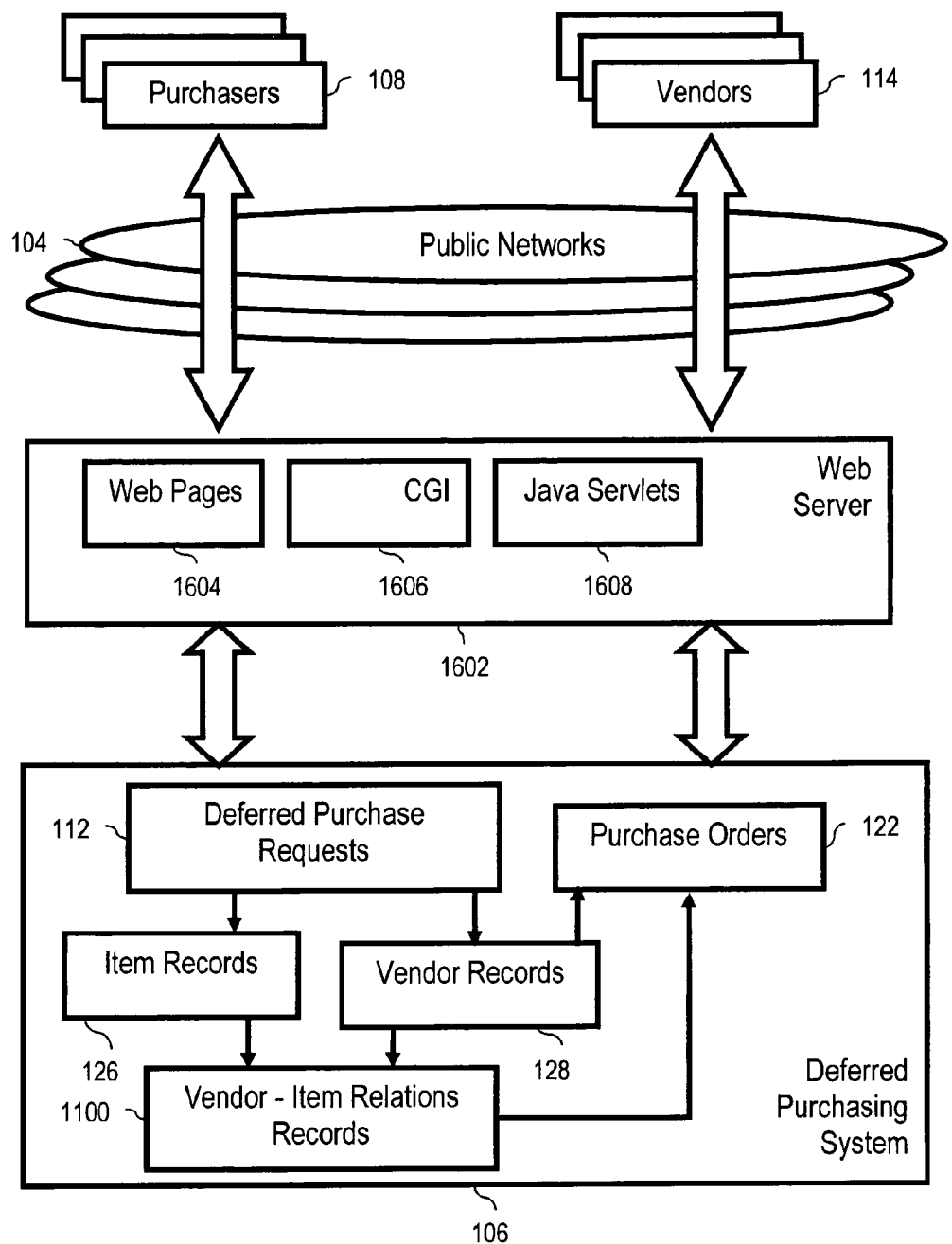
FIG. 16 is a block diagram illustrating the overall structure of an example embodiment of the present invention utilizing web-based data communications.

In some embodiments, as shown in FIG. 16, a deferred purchasing system (106) operates in conjunction with a web server having a conventional web site address publicly accessible by purchasers (108) and vendors (114). The purchaser's DCE (109 on FIG. 15, for example) is a computer system having a browser, monitor, mouse and keyboard. In this kind of embodiment, the public network (104) is an internet protocol network, and the user interface (110) includes a set of web pages (1604), HTML documents and forms, communicated between a web server and a purchaser in HTTP messages. In such embodiments, receiving (102) a DPR (112) includes receiving data for a DPR in an HTTP message from a purchaser's browser. In such embodiments, access to data and to functions within a deferred purchasing system (106) is typically accomplished through CGI gateway programs (1606) or Java servlets (1608).

In such web-based embodiments and with further respect to embodiments of the kind shown in FIG. 12, the deferred purchasing system, in addition to typical access authorization messages, typically presents as a visible message on the purchaser's monitor, a web page displayed through the purchaser's browser, such as, for example:

If you have a preference as to the method by which a vendor will be selected to fill your deferred purchase request, please click on one of the following listed methods:
Select a vendor based on the lowest price presented
Select a vendor that operates in my country
Select a vendor that operates in my state
Select a vendor that operates in my city
Select a vendor that operates in my zip code area
Select a vendor that I have used in previous purchases through this deferred purchasing system
Exclude vendors for which previous transactions with me were cancelled Typically, a deferred purchasing system according to such an embodiment records the purchaser's inputted response as data in a DPR record (112). In such embodiments, after the purchaser has clicked on the desired vendor identification criteria, and upon receipt by the deferred purchasing system web server of the purchaser's selection, the deferred purchasing system is programmed to utilize such criteria to identify a vendor for the deferred purchase. For example, if the purchaser clicks "Select a vendor that operates in my city," the deferred purchasing system typically finds, from location data in the vendor table (1000), all vendors located within the purchaser's city, and then selects one of such vendors that presents the item.

This disclosure describes in detail many alternative aspects and exemplary embodiments of the present invention, but it should be clear to readers that there are many, many more alternatives that can be embodied within the scope of the present invention. Additional alternatives include, for example, providing a purchaser with an option to select a new vendor before the issue data of a DPR. Deferred purchase systems may advantageously be expanded to include tracking of vendor discounts, discount coupon availability, promotional offers, and the like, at least some of which may become effective during the period between receipt of a DPR and the DPR's issue date. Such deferred purchasing systems can include scanning a promotions database or table keyed with vendor identification, linking vendor_ids from the promotions table to DPRs having identified vendors, and transmitting to the purchasers from whom the DPRs were received announcements or invitations to take advantage of promotional offers. Alternatively, such deferred purchasing systems, upon discovering a promotional offer that results in a lower overall purchase price for a DPR for a particular vendor, can be programmed to automatically assert the promotion on behalf of the purchaser identified in the DPR, all in accordance with one or more predefined algorithms.

Alternatively, a deferred purchasing system may be expanded to take advantage of a promotional offer from a second vendor, that is, a vendor other than a first vendor already identified to a DPR. Such a deferred purchasing system may, for example, scan a promotions table for vendor_ids, link the vendor_ids to a vendor-item relations table, then send promotions announcements to purchasers from whom DPRs were received for items associated with new promotions, giving, for example, such purchasers an option to change vendors. Alternatively, such deferred purchasing systems, upon discovering a promotion that results in a lower overall purchase price can be programmed to change vendors for a DPR according to one or more predefined algorithms.

Alternatively, a deferred purchasing can be expanded to respond appropriately to changes in vendor status, particularly an eventuality that a vendor can go out of business. Such deferred purchasing systems can advantageously be programmed to query vendors for operational status, inform affected purchasers of pertinent changes in vendor operational status, allow purchasers to choose alternate vendors as needed, and automatically select alternative vendors according to predetermined criteria such as, for example, price range, location, and so on.

Web-based user interfaces thus are alternatives to Parlay or Jain SLEE interfaces. Although FIGS. 7 and 16 respectively show telecommunications (702) and web-based communications (1602) with both purchasers (108) and vendors (114), there is no limitation in the invention itself regarding the architectures of such communications. More particularly, it is entirely within the scope of the invention for a deferred purchasing system to implement telephone menus for accepting DPRs from purchasers and web-based email for issuing purchase order to vendors. It is entirely within the scope of the invention for a deferred purchasing system to implement a web site for accepting DPRs from purchasers and issue purchase orders to vendors with automated telephone messages, and so on, including any data communications architecture as will occur to those of skill in the art.

Although the embodiments of the present invention have been described to a large extent using Parlay for telephonic user interactions with the deferred purchasing system, persons skilled in the art will recognize that such embodiments are suitably utilized in a SLEE environment as well. Both JAIN API in a SLEE environment, and the Parlay OSA API, establish a user-interface for a purchaser that provides the interaction necessary to present a variety of optional purchasing strategies to the purchaser, while prompting audibly or visibly as needed to acquire input from the purchaser. The input from the purchaser provides the data needed to create the record containing the DPR, the DPR record then being available for use with regard to payment information verification, pre-issue notifications to vendors and purchasers, determinations of purchaser proximity to potential vendors, purchaser preferences as to vendor identification criteria, and other features shown to be provided in the various embodiments of the invention.

By this point in our discussion readers clearly understand the benefits to business organizations in using various embodiments of the present invention. In particular, delayed purchase requests are supplied from a provider, such as a telephone company or an internet service provider, to any company or organization that provides telephone ordering, thereby allowing a delayed purchasing service provide cross-enterprise inventory purchasing and other supply chain functions, while providing a valued service to subscribers or providers' services generally.

It will be understood from the foregoing description that various modifications and changes may be made, and in fact will be made, in the exemplary embodiments of the present invention without departing from its true spirit. The descriptions in this specification are for purposes of illustration only and are not to be construed in a limiting sense. The scope of the present invention is limited only by the language of the following claims.

What is claimed is:

1. A method for operating a publicly accessible purchasing system, the method comprising:
   receiving, on a receipt date, from a purchaser, in a publicly accessible purchasing system, a deferred purchase request ("DPR") for an item to be purchased;
   identifying a vendor; and
   issuing, in dependence upon the DPR, a purchase order to the vendor on a date subsequent to the receipt date.

2. The method of claim 1 wherein the DPR includes an item identification for the item to be purchased, and identifying a vendor further comprises identifying a vendor in dependence upon the item identification.

3. The method of claim 1 wherein identifying a vendor further comprises selecting a selected vendor in dependence upon vendor item prices.

4. The method of claim 3 wherein selecting a selected vendor in dependence upon vendor item prices further comprises selecting a vendor having a lowest vendor item price for the item to be purchased.

5. The method of claim 1 wherein the DPR further comprises a maximum price to be paid for the item to be purchased, a vendor item price for the item is available from at least one vendor, and identifying a vendor further comprises selecting a selected vendor having a vendor item price no greater than the maximum price.

6. The method of claim 1 wherein a plurality of vendors present the item, and identifying a vendor further comprises selecting a selected vendor in dependence upon purchase orders.

7. The method of claim 6 wherein selecting a vendor in dependence upon purchase orders comprises selecting a vendor having at least one previously issued purchase order for the purchaser.

8. The method of claim 1 wherein a plurality of vendors present the item, wherein vendor records comprise vendor location data, and identifying a vendor further comprises selecting a selected vendor in dependence upon proximity of a vendor to the purchaser.

9. The method of claim 8 wherein selecting a vendor in dependence upon proximity includes selecting a vendor having an address in the same city with the purchaser.

10. The method of claim 8 wherein selecting a vendor in dependence upon proximity includes selecting a vendor having an address in the same state with the purchaser.

11. The method of claim 8 wherein selecting a vendor in dependence upon proximity includes selecting a vendor having an address in the same country with the purchaser.

12. The method of claim 1 wherein identifying a vendor further comprises:
   receiving vendor identification criteria from the purchaser; and
   identifying a vendor in dependence upon the vendor identification criteria.

13. The method of claim 1 wherein the purchasing system comprises vendor identification criteria, and identifying a vendor further comprises identifying a vendor in dependence upon the vendor identification criteria.

14. The method of claim 1 wherein receiving a DPR in a publicly accessible purchasing system further comprises receiving a DPR across a telecommunications network through a Parlay environment.

15. The method of claim 1 wherein receiving a DPR in a publicly accessible purchasing system further comprises receiving a DPR across a telecommunications network through a JAN SLEE environment.

16. The method of claim 1 wherein receiving a DPR in a publicly accessible purchasing system further comprises receiving a DPR across an internet protocol network, utilizing HTTP.

17. A system for operating a publicly accessible purchasing system, the system comprising:
   means for receiving, on a receipt date, from a purchaser, in a publicly accessible purchasing system, a deferred purchase request ("DPR") for an item to be purchased;
   means for identifying a vendor; and
   means for issuing, in dependence upon the DPR, a purchase order to the vendor on a date subsequent to the receipt date.

18. The system of claim 17 wherein the DPR includes an item identification for the item to be purchased, and means for identifying a vendor further comprises means for identifying a vendor in dependence upon the item identification.

19. The system of claim 17 wherein means for identifying a vendor further comprises means for selecting a selected vendor in dependence upon vendor item prices.

20. The system of claim 19 wherein means for selecting a selected vendor in dependence upon vendor item prices further comprises means for selecting a vendor having a lowest vendor item price for the item to be purchased.

21. The system of claim 17 wherein the DPR further comprises a maximum price to be paid for the item to be purchased, a vendor item price for the item is available from at least one vendor, and means for identifying a vendor further comprises means for selecting a selected vendor having a vendor item price no greater than the maximum price.

22. The system of claim 17 wherein a plurality of vendors present the item, and means for identifying a vendor further comprises means for selecting a selected vendor in dependence upon purchase orders.

23. The system of claim 22 wherein means for selecting a vendor in dependence upon purchase orders comprises means for selecting a vendor having at least one previously issued purchase order for the purchaser.

24. The system of claim 17 wherein a plurality of vendors present the item, wherein vendor records comprise vendor location data, and means for identifying a vendor further comprises means for selecting a selected vendor in dependence upon proximity of a vendor to the purchaser.

25. The system of claim 24 wherein means for selecting a vendor in dependence upon proximity includes means for selecting a vendor having an address in the same city with the purchaser.

26. The system of claim 24 wherein means for selecting a vendor in dependence upon proximity includes means for selecting a vendor having an address in the same state with the purchaser.

27. The system of claim 24 wherein means for selecting a vendor in dependence upon proximity includes means for selecting a vendor having an address in the same country with the purchaser.

28. The system of claim 17 wherein means for identifying a vendor further comprises:
   means for receiving vendor identification criteria from the purchaser; and
   means for identifying a vendor in dependence upon the vendor identification criteria.

29. The system of claim 17 wherein the purchasing system comprises vendor identification criteria, and means for identifying a vendor further comprises means for identifying a vendor in dependence upon the vendor identification criteria.

30. The system of claim 17 wherein means for receiving a DPR in a publicly accessible purchasing system further comprises means for receiving a DPR across a telecommunications network through a Parlay environment.

31. The system of claim 17 wherein means for receiving a DPR in a publicly accessible purchasing system further comprises means for receiving a DPR across a telecommunications network through a JAN SLEE environment.

32. The system of claim 17 wherein means for receiving a DPR in a publicly accessible purchasing system further comprises means for receiving a DPR across an internet protocol network utilizing HTTP.

33. A computer program product for operating a publicly accessible purchasing system, the computer program product comprising:
   a recording medium;
   means, recorded on the recording medium, for receiving, on a receipt date, from a purchaser, in a publicly accessible purchasing system, a deferred purchase request ("DPR") for an item to be purchased;
   means, recorded on the recording medium, for identifying a vendor; and
   means, recorded on the recording medium, for issuing, in dependence upon the DPR, a purchase order to the vendor on a date subsequent to the receipt date.

34. The computer program product of claim 33 wherein the DPR includes an item identification for the item to be purchased, and means, recorded on the recording medium, for identifying a vendor further comprises means, recorded on the recording medium, for identifying a vendor in dependence upon the item identification.

35. The computer program product of claim 33 wherein means, recorded on the recording medium, for identifying a vendor further comprises means, recorded on the recording medium, for selecting a selected vendor in dependence upon vendor item prices.

36. The computer program product of claim 35 wherein means, recorded on the recording medium, for selecting a selected vendor in dependence upon vendor item prices further comprises means, recorded on the recording medium, for selecting a vendor having a lowest vendor item price for the item to be purchased.

37. The computer program product of claim 33 wherein the DPR further comprises a maximum price to be paid for the item to be purchased, a vendor item price for the item is available from at least one vendor, and means, recorded on the recording medium, for identifying a vendor further comprises means, recorded on the recording medium, for selecting a selected vendor having a vendor item price no greater than the maximum price.

38. The computer program product of claim 33 wherein a plurality of vendors present the item, and means, recorded on the recording medium, for identifying a vendor further comprises means, recorded on the recording medium, for selecting a selected vendor in dependence upon purchase orders.

39. The computer program product of claim 38 wherein means, recorded on the recording medium, for selecting a vendor in dependence upon purchase orders comprises means, recorded on the recording medium, for selecting a vendor having at least one previously issued purchase order for the purchaser.

40. The computer program product of claim 33 wherein a plurality of vendors present the item, wherein vendor records comprise vendor location data, and means, recorded on the recording medium, for identifying a vendor further comprises means, recorded on the recording medium, for selecting a selected vendor in dependence upon proximity of a vendor to the purchaser.

41. The computer program product of claim 40 wherein means, recorded on the recording medium, for selecting a vendor in dependence upon proximity includes means, recorded on the recording medium, for selecting a vendor having an address in the same city with the purchaser.

42. The computer program product of claim 40 wherein means, recorded on the recording medium, for selecting a vendor in dependence upon proximity includes means, recorded on the recording medium, for selecting a vendor having an address in the same state with the purchaser.

43. The computer program product of claim 40 wherein means, recorded on the recording medium, for selecting a vendor in dependence upon proximity includes means, recorded on the recording medium, for selecting a vendor having an address in the same country with the purchaser.

44. The computer program product of claim 33 wherein means, recorded on the recording medium, for identifying a vendor further comprises:
  means, recorded on the recording medium, for receiving vendor identification criteria from the purchaser; and
  means, recorded on the recording medium, for identifying a vendor in dependence upon the vendor identification criteria.

45. The computer program product of claim 33 wherein the purchasing system comprises vendor identification criteria, and means, recorded on the recording medium, for identifying a vendor further comprises means, recorded on the recording medium, for identifying a vendor in dependence upon the vendor identification criteria.

46. The computer program product of claim 33 wherein means, recorded on the recording medium, for receiving a DPR in a publicly accessible purchasing system further comprises means, recorded on the recording medium, for receiving a DPR across a telecommunications network through a Parlay environment.

47. The computer program product of claim 33 wherein means, recorded on the recording medium, for receiving a DPR in a publicly accessible purchasing system further comprises means, recorded on the recording medium, for receiving a DPR across a telecommunications network through a JAIN SLEE environment.

48. The computer program product of claim 33 wherein means, recorded on the recording medium, for receiving a DPR in a publicly accessible purchasing system further comprises means, recorded on the recording medium, for receiving a DPR across an internet protocol network utilizing HTTP.

\* \* \* \* \*

UNITED STATES PATENT AND TRADEMARK OFFICE
CERTIFICATE OF CORRECTION

PATENT NO. : 7,580,863 B2  Page 1 of 1
APPLICATION NO. : 10/205122
DATED : August 25, 2009
INVENTOR(S) : Broussard et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1902 days.

Signed and Sealed this

Fourteenth Day of September, 2010

David J. Kappos
*Director of the United States Patent and Trademark Office*